(12) United States Patent
Gardner et al.

(10) Patent No.: US 11,993,185 B2
(45) Date of Patent: May 28, 2024

(54) VEHICLE SEAT HAVING INTEGRATE CHILD CARRIER

(71) Applicant: E.V.S. Ltd., South Bend, IN (US)

(72) Inventors: Stewart E. Gardner, Elkhart, IN (US); Thomas A. Downey, South Bend, IN (US); Thomas Rumler, Dowagiac, MI (US)

(73) Assignee: E.V.S. Ltd., South Bend, IN (US)

( * ) Notice: Subject to any disclaimer, the term of this patent is extended or adjusted under 35 U.S.C. 154(b) by 453 days.

(21) Appl. No.: 16/668,998

(22) Filed: Oct. 30, 2019

(65) Prior Publication Data

US 2020/0139858 A1    May 7, 2020

Related U.S. Application Data

(60) Provisional application No. 62/753,996, filed on Nov. 1, 2018.

(51) Int. Cl.
*B60N 2/28* (2006.01)
*B60N 2/30* (2006.01)

(52) U.S. Cl.
CPC ......... *B60N 2/2833* (2013.01); *B60N 2/2812* (2013.01); *B60N 2/3081* (2013.01)

(58) Field of Classification Search
CPC ...... B60N 2/28; B60N 2/2812; B60N 2/2833; B60N 2/3801; B60N 2/3804; B60N 2/3086; B60N 2/2824; B60N 2/2827; B60N 2/283; B60N 2/2872; B60N 2/30; B60N 2/3081; B60N 2/3084; B64D 11/0612; A47D 1/10; A47D 13/025
See application file for complete search history.

(56) References Cited

U.S. PATENT DOCUMENTS 2,584,481 A * 2/1952 Mast .................... B60N 2/3084
297/115
3,272,554 A * 9/1966 P Simer ............... B60N 2/2839
297/256

(Continued)

FOREIGN PATENT DOCUMENTS

CN    106183909 A  * 12/2016
CN    108045281 A  *  5/2018

(Continued)

*Primary Examiner* — Ryan D Kwiecinski
(74) *Attorney, Agent, or Firm* — Crump Law P.C.

(57) ABSTRACT

The vehicle seat includes an integral child carrier that deploys and unfolds for use as either a child seat or an infant cradle for safely transporting infants while being conveniently stowed when not in use. The child carrier includes a folding seat/cradle that in certain embodiments doubles as both an upright child seat and reclined infant cradle. The folding seat/cradle rides on its own carrier sub-frame that is mounted to the main seat back frame. The carrier sub-frame allows the seat/cradle movement between a stowed position where the folded seat/cradle lies flat within or against the seat back frame and a deployed position where the unfolded seat/cradle extends outward from the seat back frame. The carrier sub-frame includes one or more slide rails, slide blocks, a linkage member and a latch assembly. The seat/cradle includes a seat panel hinged to a back panel that unfold to form a secure seat or cradle from a flat stowed package.

18 Claims, 26 Drawing Sheets

(56) References Cited

U.S. PATENT DOCUMENTS

| | | | | |
|---|---|---|---|---|
| 4,480,870 A * | 11/1984 | von Wimmersperg | ................. | B60N 2/2809 297/216.11 |
| 4,540,216 A * | 9/1985 | Hassel, Sr. | ............ | B60N 2/3084 297/112 |
| 4,555,135 A * | 11/1985 | Freeland | ............... | B60N 2/3086 297/105 |
| 4,596,420 A * | 6/1986 | Vaidya | ................. | B60N 2/3084 297/233 |
| 4,632,456 A * | 12/1986 | Kassai | ................. | B60N 2/2839 297/328 |
| 4,709,960 A * | 12/1987 | Launes | ................. | A47D 1/002 297/256.13 |
| 4,756,573 A * | 7/1988 | Simin | ................. | B60N 2/3084 297/117 |
| 4,900,087 A * | 2/1990 | Crisp | ................. | B60N 2/3084 297/112 |
| 4,902,069 A * | 2/1990 | Lehnert | ............... | B64D 11/0691 297/14 |
| 4,936,627 A * | 6/1990 | Guim | ................. | B60N 2/3084 297/238 |
| 4,943,112 A * | 7/1990 | Law | ................. | B60N 2/3084 297/112 |
| 4,986,600 A * | 1/1991 | Leblanc | ............... | B60N 2/3084 297/112 |
| 5,100,199 A * | 3/1992 | Vander Stel | ......... | A61K 31/155 297/238 |
| 5,106,158 A * | 4/1992 | Dukatz | ................. | B60N 2/3084 297/112 |
| 5,161,855 A * | 11/1992 | Harmon | ............... | B60N 2/3084 297/238 |
| 5,385,384 A * | 1/1995 | Gierman | ............... | B60N 2/3084 297/216.11 |
| 5,466,043 A * | 11/1995 | Lambert | ............... | B60N 2/3084 297/238 |
| 5,524,962 A * | 6/1996 | Fulgenzi | ............... | B60N 2/3081 297/236 |
| 5,524,965 A * | 6/1996 | Barley | ................. | B60N 2/2827 297/252 |
| 5,542,742 A * | 8/1996 | Fulgenzi | ............... | B60N 2/3086 297/236 |
| 5,775,771 A * | 7/1998 | La Cour | ............... | B60N 2/3084 297/188.04 |
| 5,810,436 A * | 9/1998 | Surot | ................. | B60N 2/2821 297/256.13 |
| 5,899,534 A * | 5/1999 | Gray | ................. | B60N 2/3084 297/484 |
| 6,089,662 A * | 7/2000 | Lambert | ............... | B60R 22/105 297/238 |
| 6,220,665 B1 * | 4/2001 | Dingel | ................. | B60N 2/3084 297/326 |
| 6,474,732 B1 * | 11/2002 | Merensky | .......... | B64D 11/0698 297/14 |
| 7,070,239 B1 * | 7/2006 | Ugrekhelidze | ...... | B60N 2/3084 297/105 |
| 7,517,016 B1 * | 4/2009 | West | ................. | B60N 2/832 297/236 |
| 7,997,647 B2 * | 8/2011 | Sjoquist | ............... | B60N 2/143 297/238 |
| 9,022,462 B2 * | 5/2015 | Johnson | ............... | B64D 11/06 297/14 |
| 9,227,535 B2 * | 1/2016 | Coman | ............... | B64D 11/062 |
| 10,293,944 B2 * | 5/2019 | Spagl | ................. | B64D 11/062 |
| 10,766,386 B1 * | 9/2020 | West | ................. | B60N 2/265 |
| 11,021,084 B2 * | 6/2021 | Sakurai | ............... | B60N 2/3047 |
| 2004/0232747 A1 | 11/2004 | Yamazaki | ........... | B60N 2/2806 297/250.1 |
| 2006/0055228 A1 * | 3/2006 | Tsai | ................. | B60N 2/2839 297/488 |
| 2007/0170758 A1 * | 7/2007 | Allen | ................. | B60N 2/2812 297/250.1 |
| 2009/0206640 A1 * | 8/2009 | Chen | ................. | B60N 2/3084 297/216.11 |
| 2011/0233978 A1 * | 9/2011 | Clement | ............... | B60N 2/2884 297/256.13 |
| 2013/0187421 A1 * | 7/2013 | Foye | ................. | B60R 22/20 297/232 |
| 2017/0101035 A1 * | 4/2017 | Sam | ................. | B60N 2/2866 |
| 2018/0134186 A1 * | 5/2018 | Mizuno | ................. | B60N 2/22 |
| 2018/0201162 A1 * | 7/2018 | Sasaki | ................. | B60N 2/181 |
| 2019/0152355 A1 * | 5/2019 | Mizuno | ................. | B60N 2/32 |
| 2019/0184861 A1 * | 6/2019 | Virdis | ................. | B60N 2/26 |
| 2019/0389337 A1 * | 12/2019 | Johnson | ............... | B60N 2/265 |
| 2020/0130848 A1 * | 4/2020 | Bakhsh | ................. | B60N 2/26 |

FOREIGN PATENT DOCUMENTS

| | | | |
|---|---|---|---|
| GB | 2360938 A * | 10/2001 | ............... A47D 1/10 |
| WO | WO-9212024 A1 * | 7/1992 | ............. B60N 2/242 |

* cited by examiner

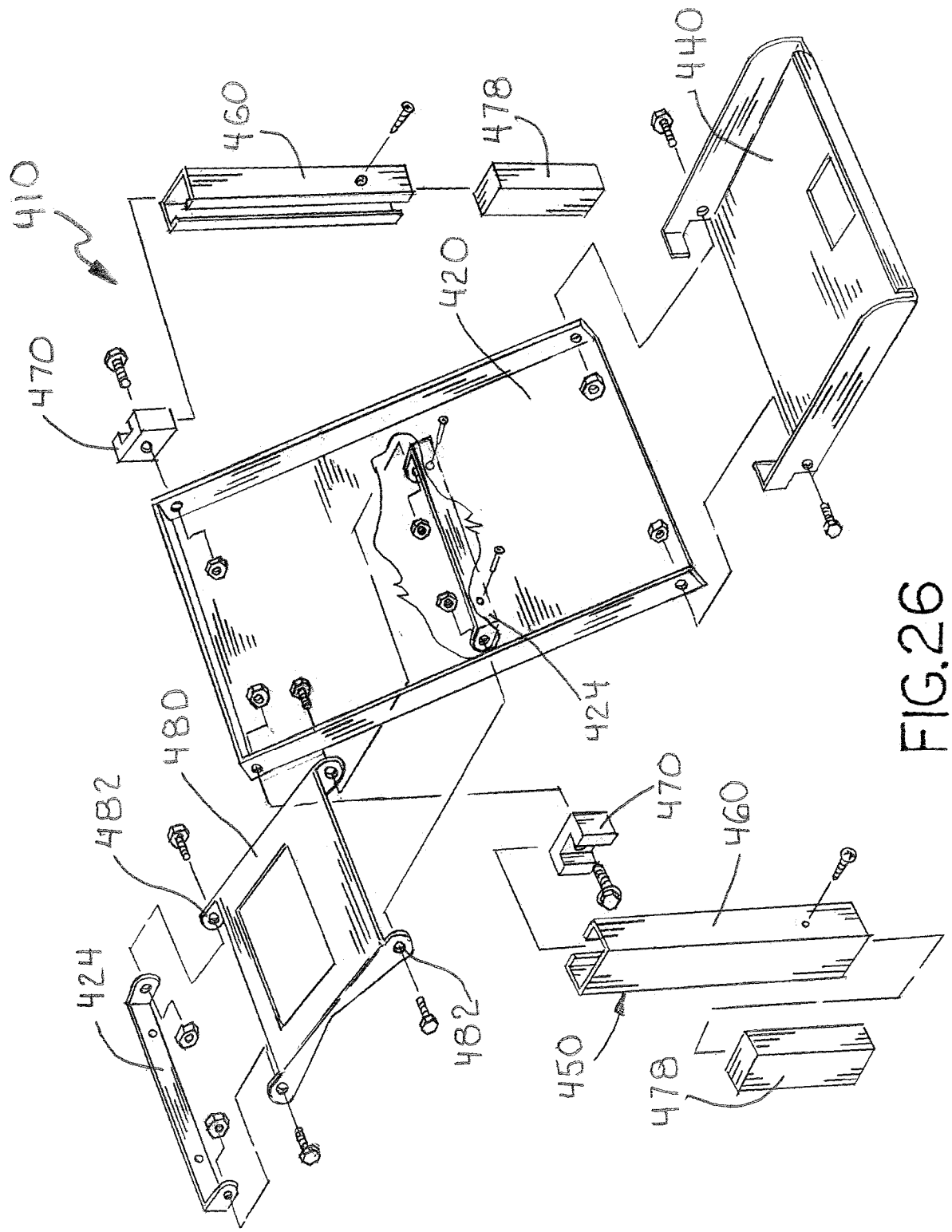

VEHICLE SEAT HAVING INTEGRATE CHILD CARRIER

This application claims the benefit of U.S. Provisional Application No. 62/753,996 filed Oct. 30, 2018, the disclosure of which is hereby incorporated by reference.

This invention relates to a vehicle seat for use in emergency response vehicles and common carrier vehicles that includes an integrated child carrier that deploys as either a child seat or infant cradle.

BACKGROUND AND SUMMARY OF THE INVENTION

It is often necessary to transport non-patient infants in emergency response vehicles, such as ambulances, fire/rescue trucks and boats, helicopters and airplanes. Many conventional safety chairs used in an emergency response vehicle are configurable to carry both adults and small children, but infants typically require special carriers or "infant car seats" that are strapped atop the safety chair's seat. The dangers of transporting infants without proper safety seating is well-known and often illegal in most jurisdictions in the United States. While, emergency response vehicles are often exempt from such restrictions, an infant can be seriously injured if the emergency response vehicle is involved in an accident while the infant is being carried outside a proper infant safety seat.

The vehicle seat of this invention includes an integral child carrier that deploys and unfolds for use as either a child seat or an infant cradle for safely transporting infants while being conveniently stowed when not in use. The child carrier includes a folding seat/cradle that in certain embodiments doubles as both an upright child seat and reclined infant cradle. The folding seat/cradle rides on its own carrier sub-frame that is mounted to the main seat back frame. The carrier sub-frame allows the seat/cradle movement between a stowed position where the folded seat/cradle lies flat within or against the seat back frame and a deployed position where the unfolded seat/cradle extends outward from the seat back frame. The carrier sub-frame includes one or more slide rails, slide blocks, a linkage member and a latch assembly. The seat/cradle includes a seat panel hinged to a back panel that unfold to form a secure seat or cradle from a flat stowed package.

In certain embodiments, the carrier sub frame and seat/cradle are mounted externally to the back side of the vehicle seat. In other embodiments, the child carrier is mounted within the seat back to deploy outward from within the vehicle seat. Alternatively, the child carrier can be adapted to deploy from other vehicle structures, such as interior walls and cabinetry.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangement of system and method components. The drawings are only for purposes of illustrating exemplary embodiments and are not to be construed as limiting the invention. The drawings illustrate the present invention, in which:

FIG. 26 is an exploded view of the child carrier of FIG. 25.

DESCRIPTION OF THE PREFERRED EMBODIMENT

Figure 1:
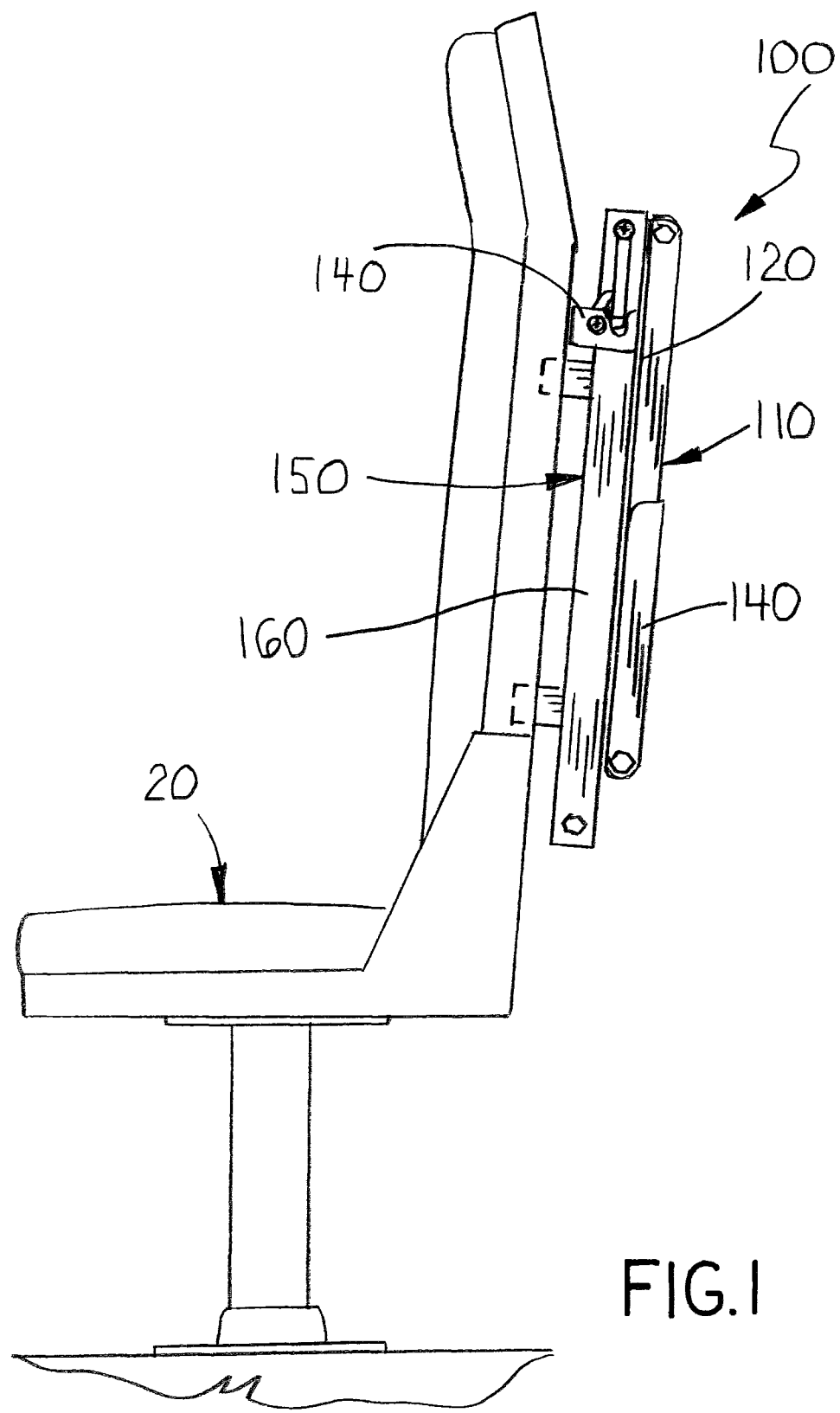
FIG. 1 is a side view of a vehicle seat having an exemplary embodiment of the child carrier of the invention mounted to the seat back and shown in the stowed position.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical, structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

The vehicle seats and integrated child carriers of this invention are used for safely transporting toddlers and infants while being conveniently stowed when not in use. Each embodiment of the vehicle seat and child carrier includes a folding seat/cradle that shiftably deploys from a seat back frame and unfolds into a convenient child seat or infant cradle. In certain embodiments, the vehicle seats and child carriers may be adapted for a variety of transportation applications, but are ideally suited for use in emergency response vehicles, such as ambulances, fire/rescue trucks and boats, helicopters and airplanes. In other embodiments, the child carrier may also be used as a wall or seat mounted unit, or be integrated directly into the design of a conventional vehicle seat.

Referring now to the drawings, FIGS. 1-10 illustrate an exemplary embodiment of a vehicle safety seat 20 using the child carrier of this invention, which is designated generally as reference numeral 100. Typically, vehicle seat 20 is of the type used in emergency response vehicles and are well known in the art. Child carrier 100 is designed and intended to support and carrier an infant or toddler generally under the weight of 65 lbs on the back of seat 20. Generally, infant weight range from 5-20 lbs. and toddler weights range from 20-65 lbs. Child carrier 100 includes a folding seat/cradle 110 and a carrier sub-frame 150. As shown, child carrier 100 is mounted externally to the seat back of a vehicle seat 20. Seat/cradle 110 deploys outward from a stowed position against the seat back to a deployed position and manually expands from a folded position to an unfolded position.

Seat/cradle 110 is generally constructed or fabricated from sheet metal, such as stainless steel or aluminum, but may be formed or molded from a polymer plastic. The materials are selected to provide a pliable, yet sturdy base for carrying an infant that can be easily cleaned and disinfected. Typically, cradle 110 is covered by a removable padded liner or covering (not shown) that encloses any exposed surfaces of the cradle, but also moves and folds with the cradle. Folding cradle 110 also includes a belting assembly (not shown) used to strap an infant into the cradle, such belting assemblies are well known in the art. Seat/cradle 110 includes a back panel 120, side panels 130 and a seat panel 140. Back panel 120 has a peripheral flange 122, which extends around its top and sides. Seat panel 140 has opposed side flanges 142. Seat panel 140 is pivotally connected to the bottom edge of back panel 120 by pivot fasteners 144 that extend through aligned holes in side flanges 122 and 142. Folding side panels 130 are pivotally connected to cradle back 120 by side hinges 132. Each side panel 130 has a keyhole post 134 that extends outward therefrom. Seat panel 140 has a pair of keyhole shaped openings 145 formed along its bottom edge, which are shaped to receive the profile of keyhole post 134. Seat panel 140 also has holes 147 formed in its side flange also for receiving keyhole post 134. Seat panel 140 also includes a pivoting L-channel cover 146 connected to its inner surface by a hinge 148. Seat/cradle 110 also includes two sets of mounting brackets 124 and 126 affixed to the backside of back panel 120.

Figure 2:
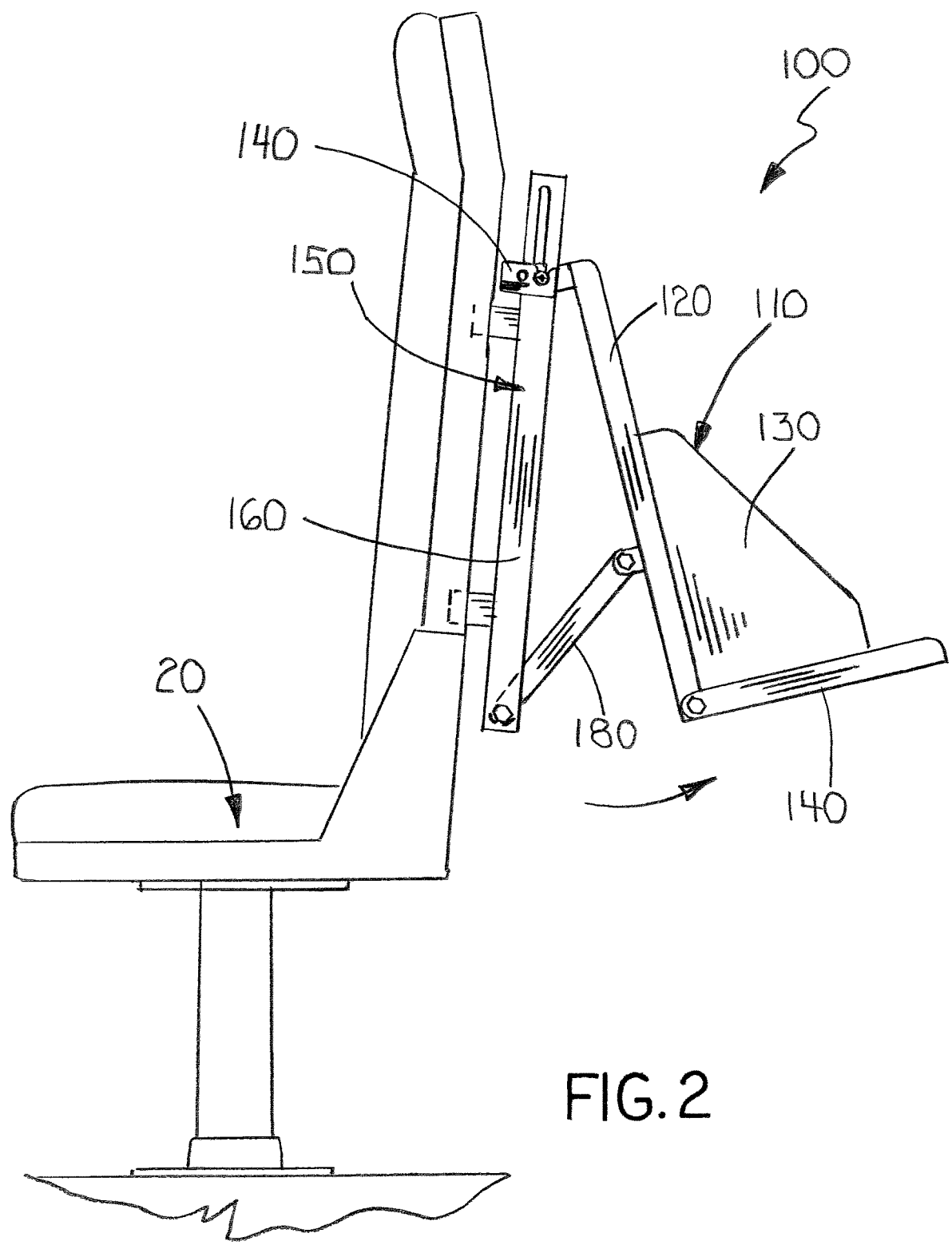
FIG. 2 is a side view of the vehicle seat and child carrier of FIG. 1 shown in the deployed position.
Figure 3:
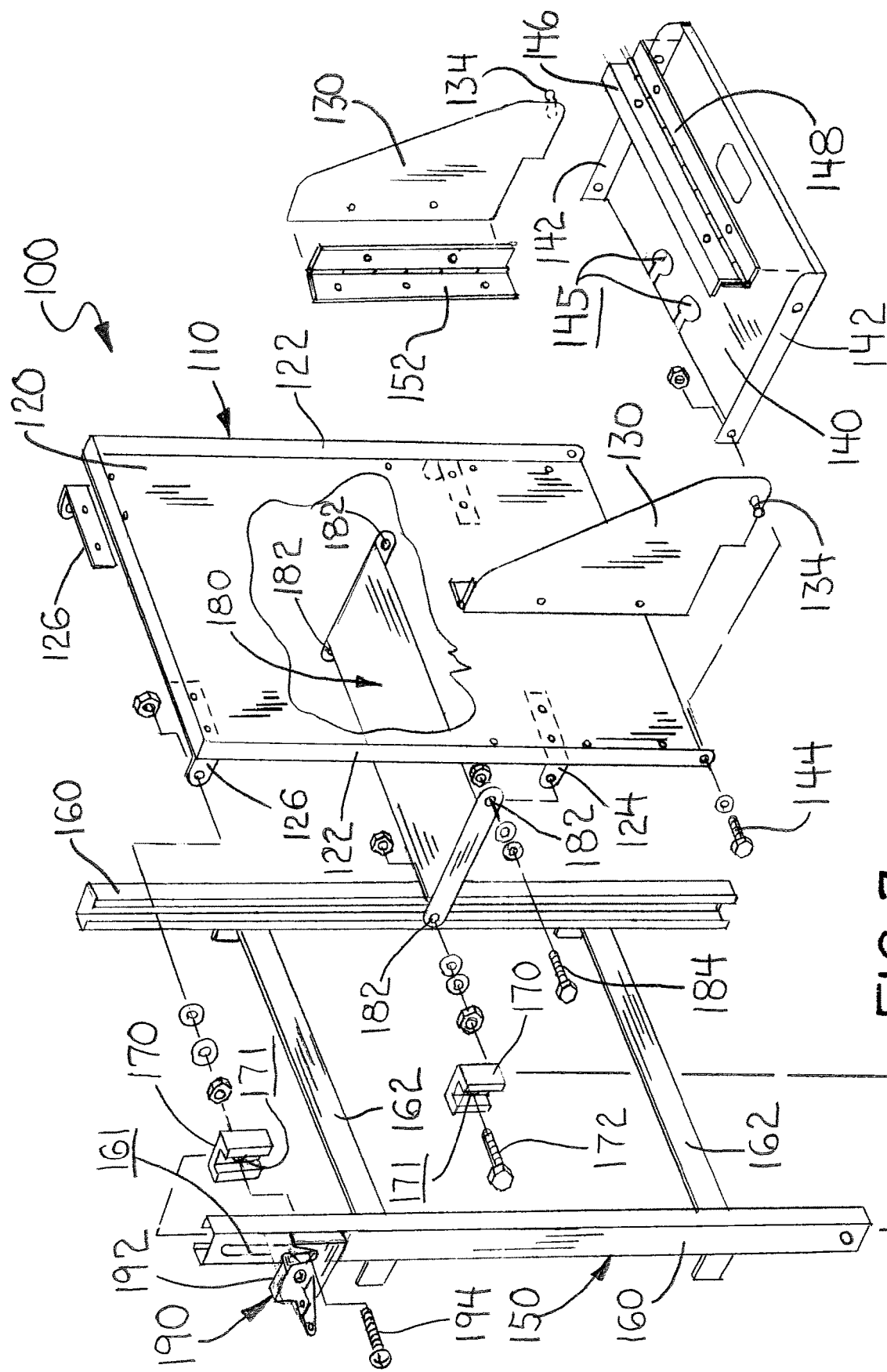
FIG. 3 is an exploded view of the child carrier of FIG. 1.
Figure 4:
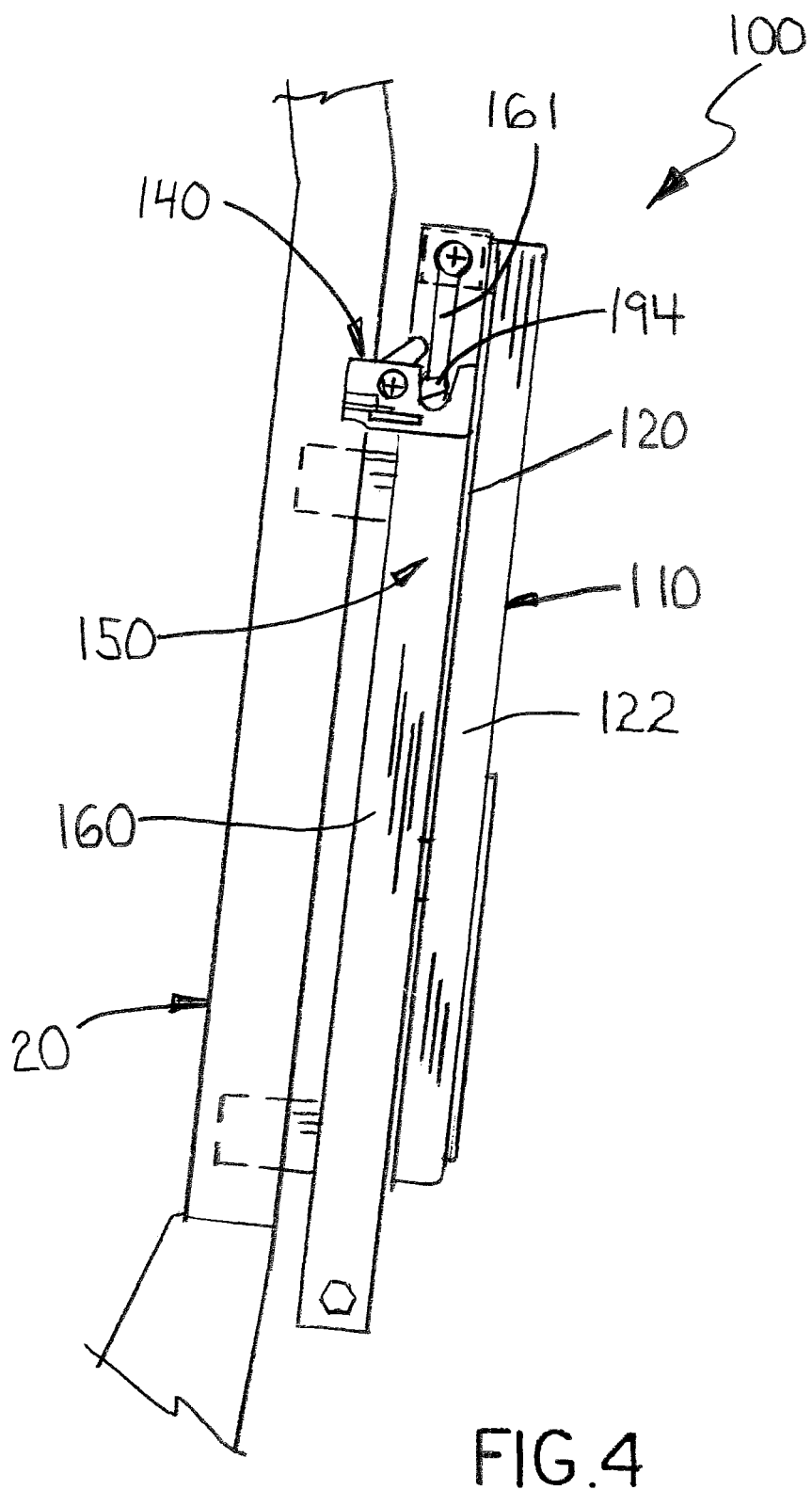
FIG. 4 is another partial side view of the child carrier of FIG. 1 mounted to the back of a conventional safety chair, shown in the stowed position.
Figure 5:
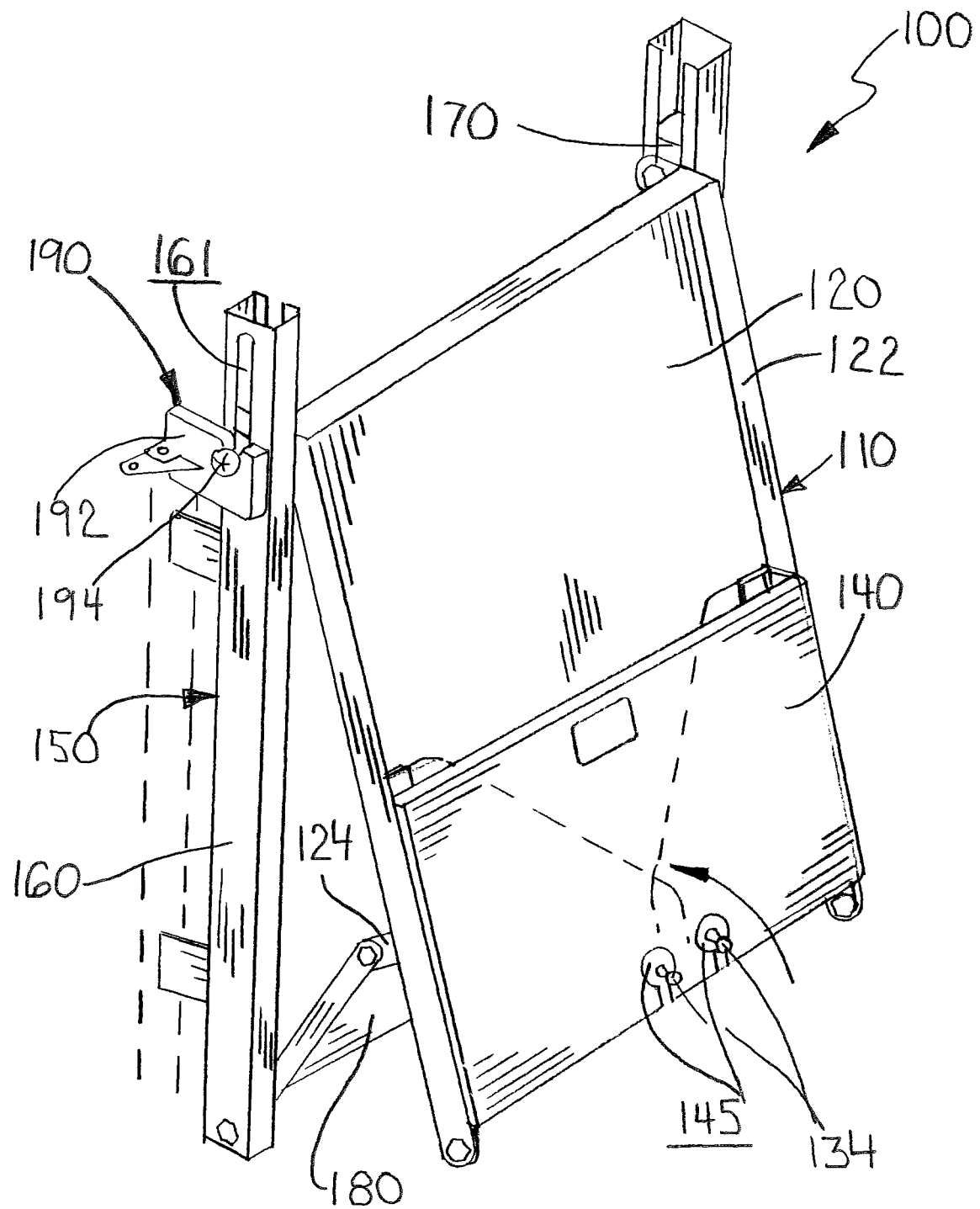
FIG. 5 is a partial perspective view of the child carrier of FIG. 1 shown partially deployed with the cradle folded.
Figure 6:
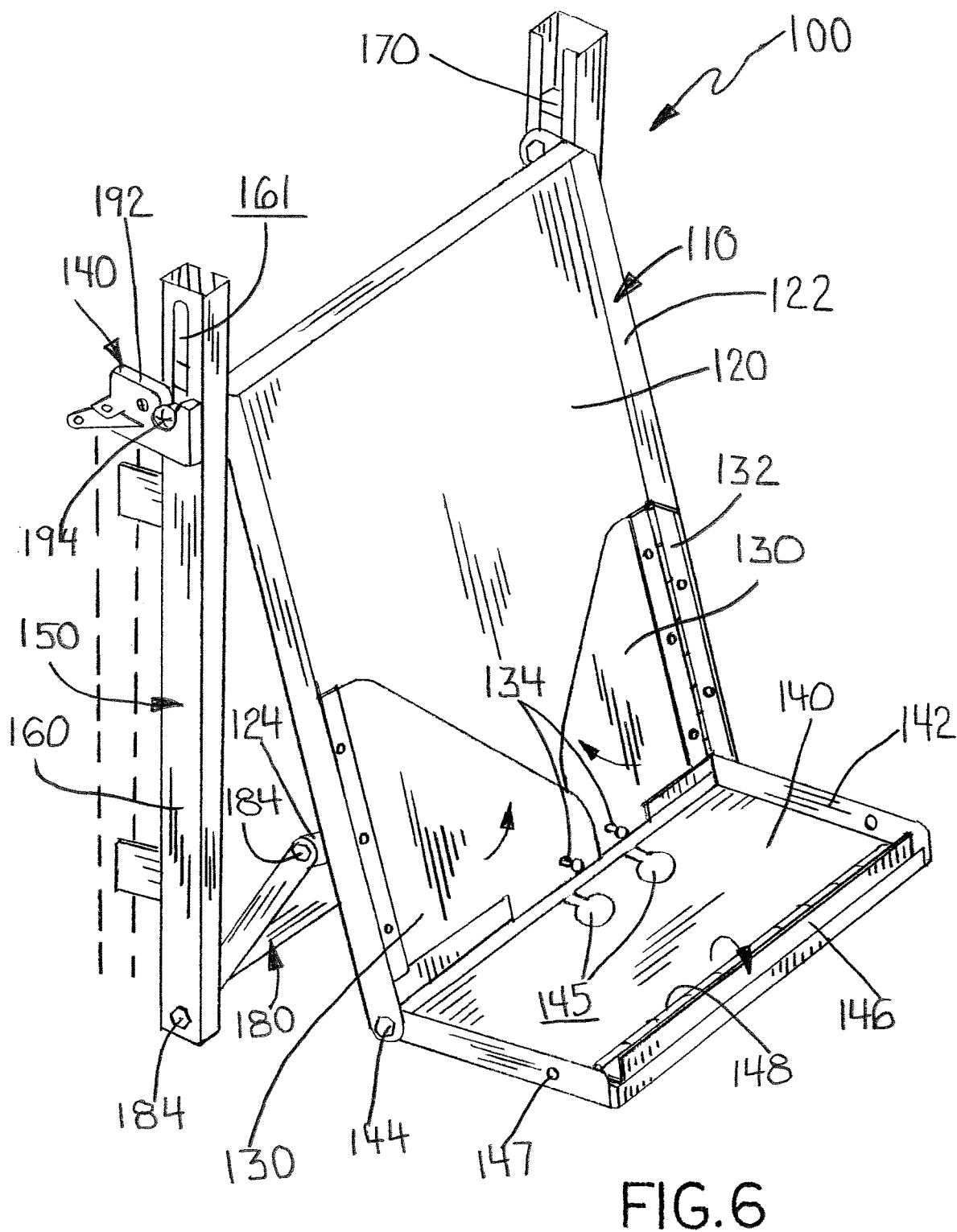
FIG. 6 is a partial perspective view of the child carrier of FIG. 1 shown partially deployed with the cradle partially unfolded.
Figure 7:
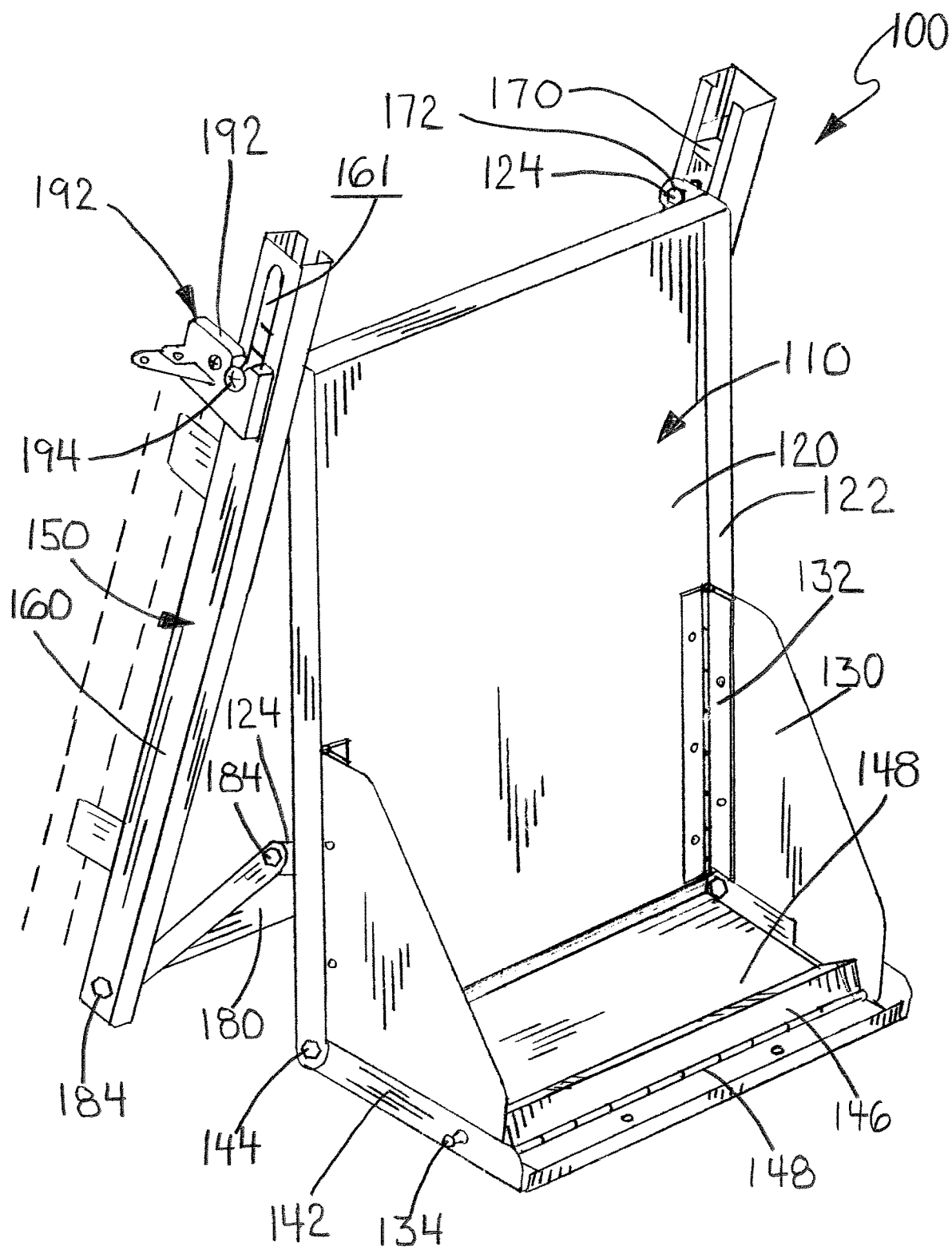
FIG. 7 is a partial perspective view of the child carrier of FIG. 1 shown fully deployed with the cradle fully unfolded.
Figure 8:
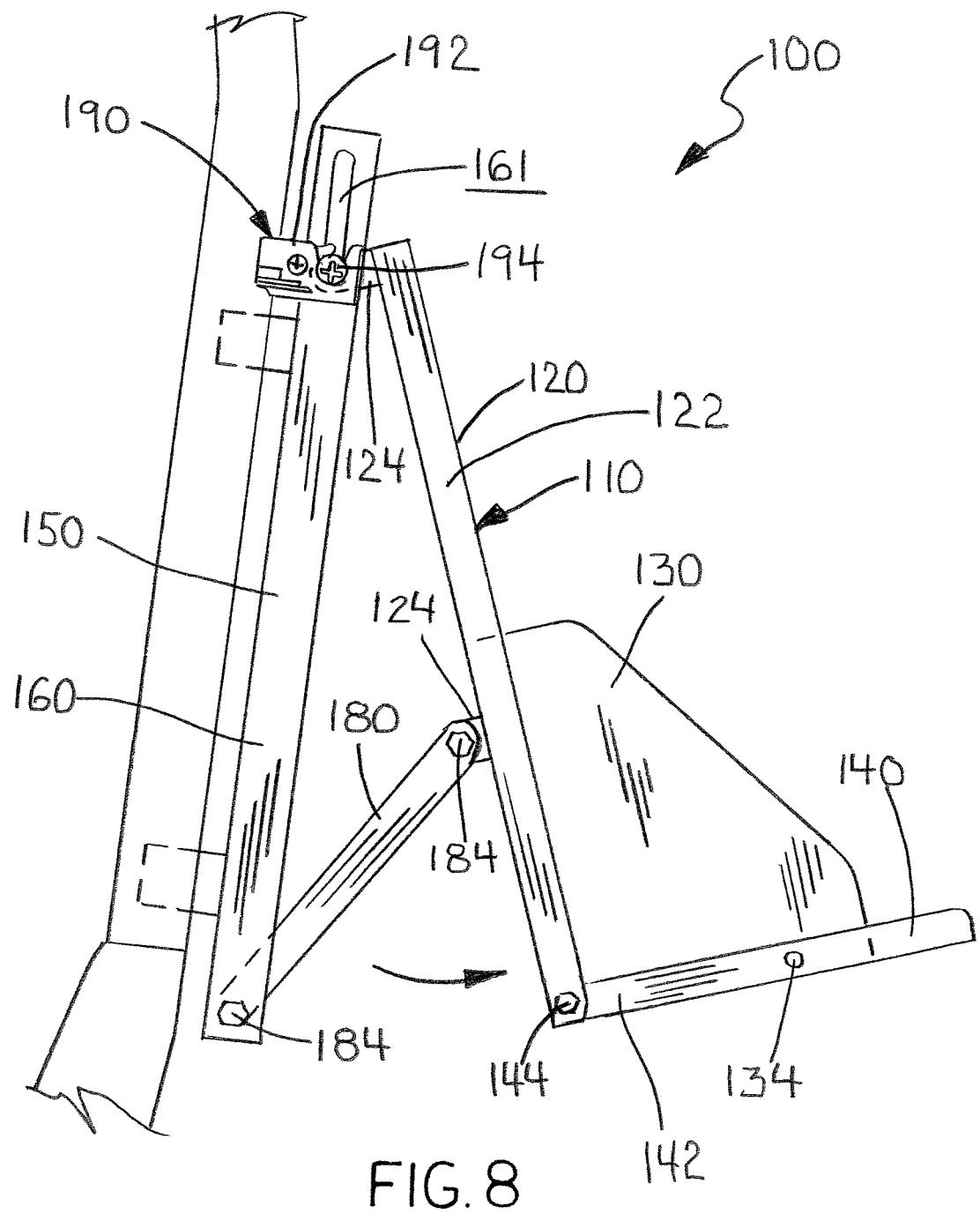
FIG. 8 is a partial side view of the vehicle seat and child carrier of FIG. 1 shown partially deployed with the cradle partially unfolded.
Figure 9:
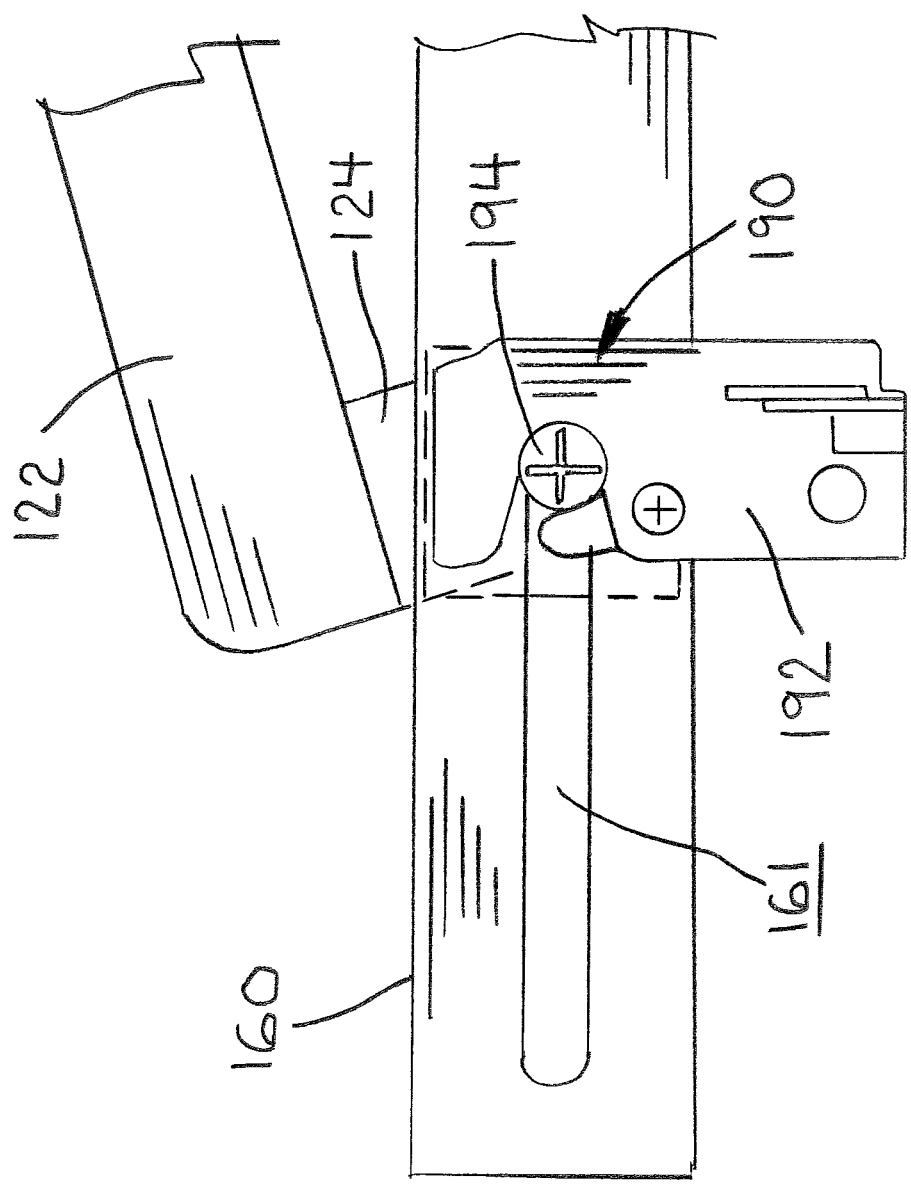
FIG. 9 is a partial side view of the latch mechanism used in the child carrier of FIG. 1 shown with the folding cradle in the deployed position.
Figure 10:
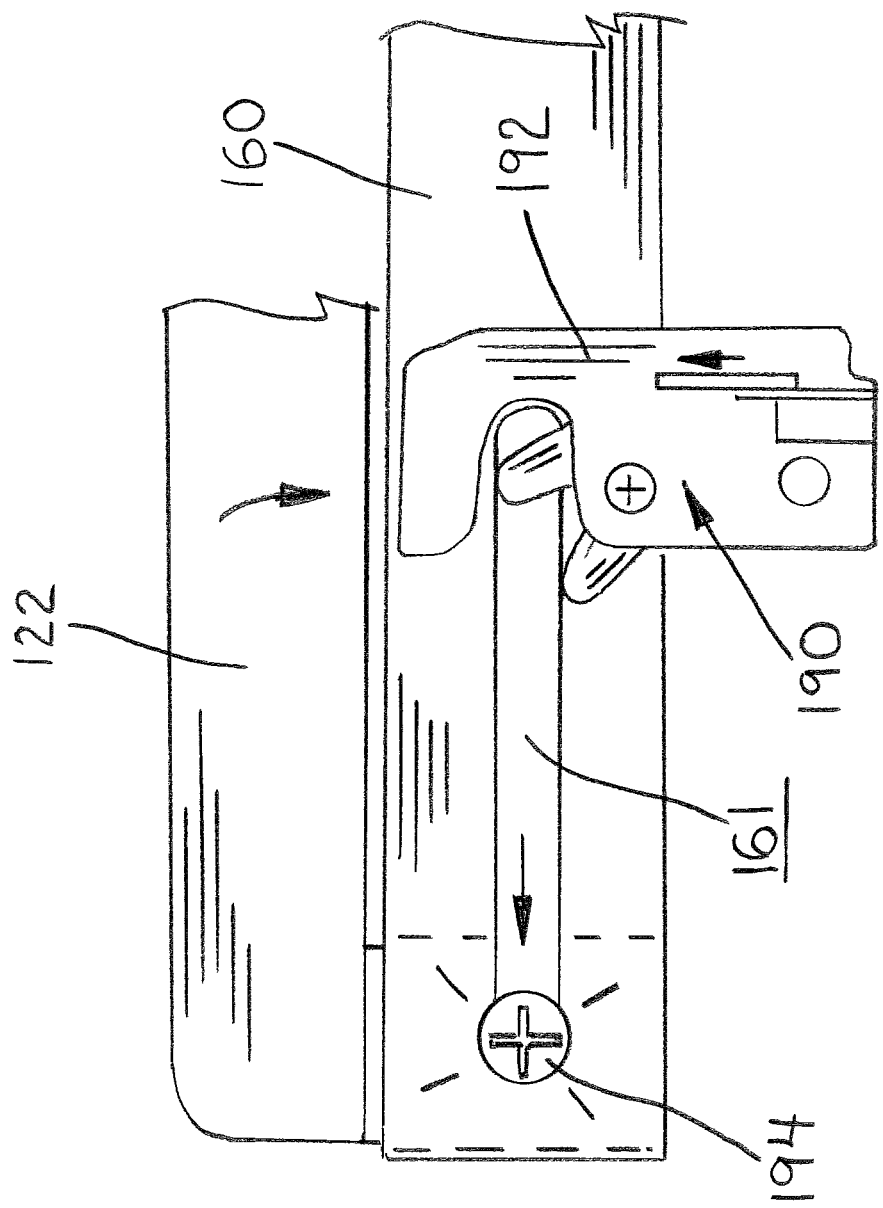
FIG. 10 is a partial side view of the latch mechanism used in the child carrier of FIG. 1 shown with the folding cradle in the deployed position.
Figure 11:
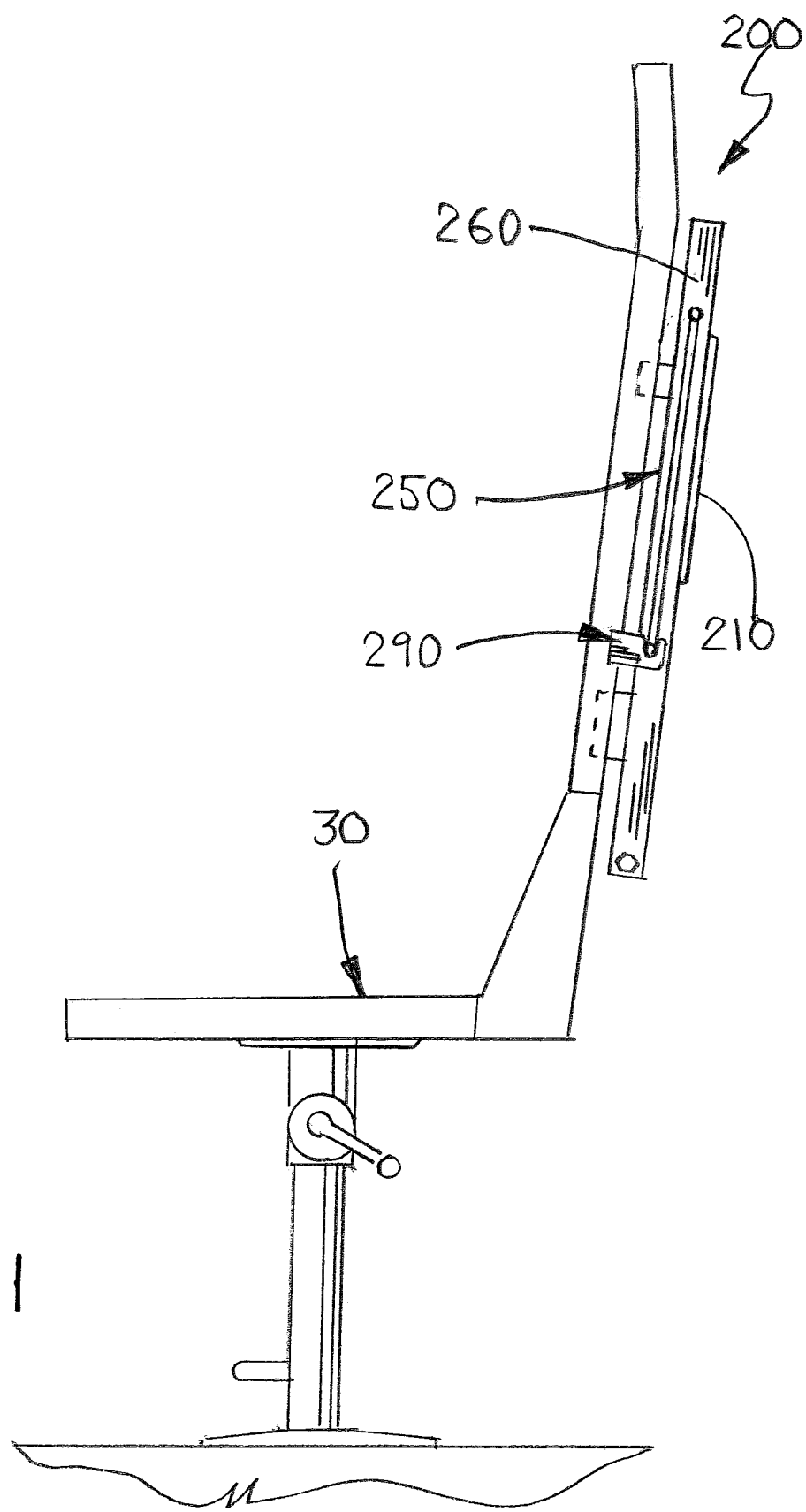
FIG. 11 is a side view of a second vehicle seat having another exemplary embodiment of the child carrier of the invention mounted to the seat back, shown in the stowed position and with the chair in an upright orientation.
Figure 12:
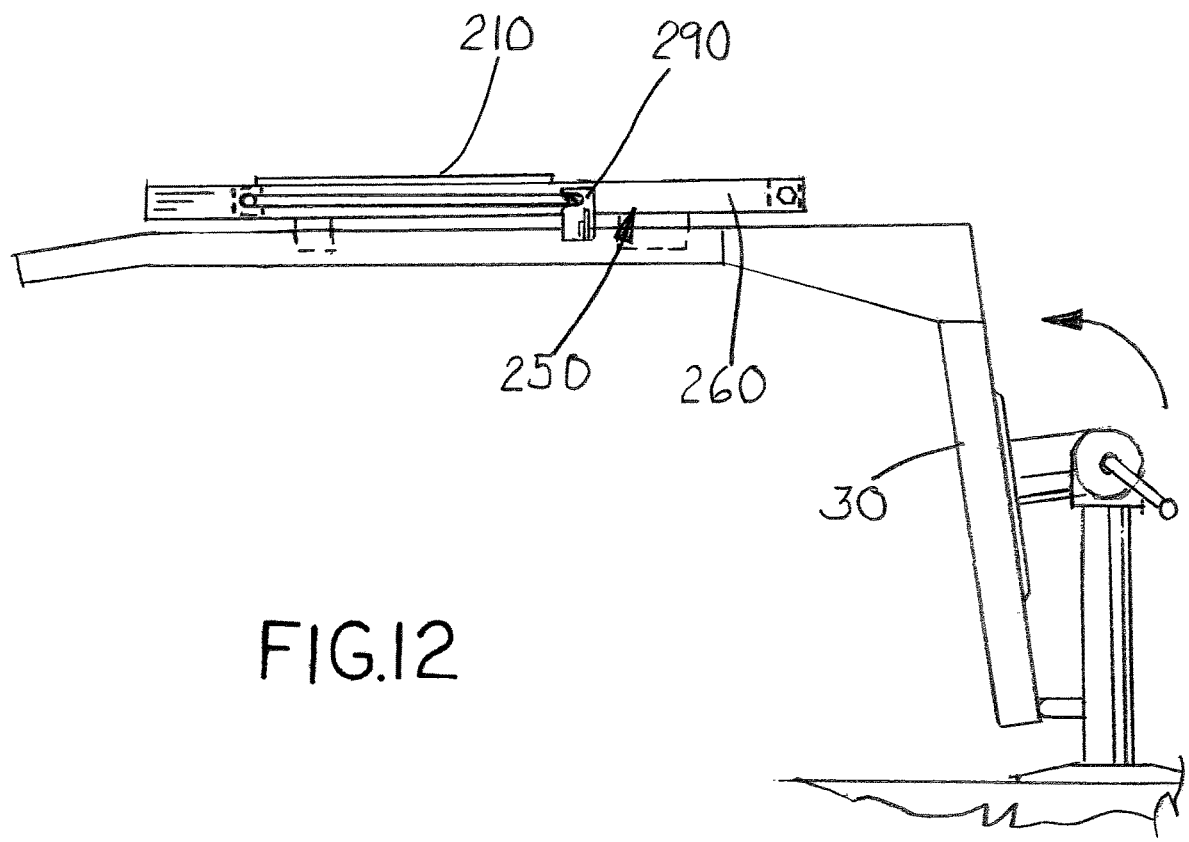
FIG. 12 is a side view of the vehicle seat and child carrier of FIG. 11 shown in the stowed position and with the seat back in a horizontal orientation.
Figure 13:
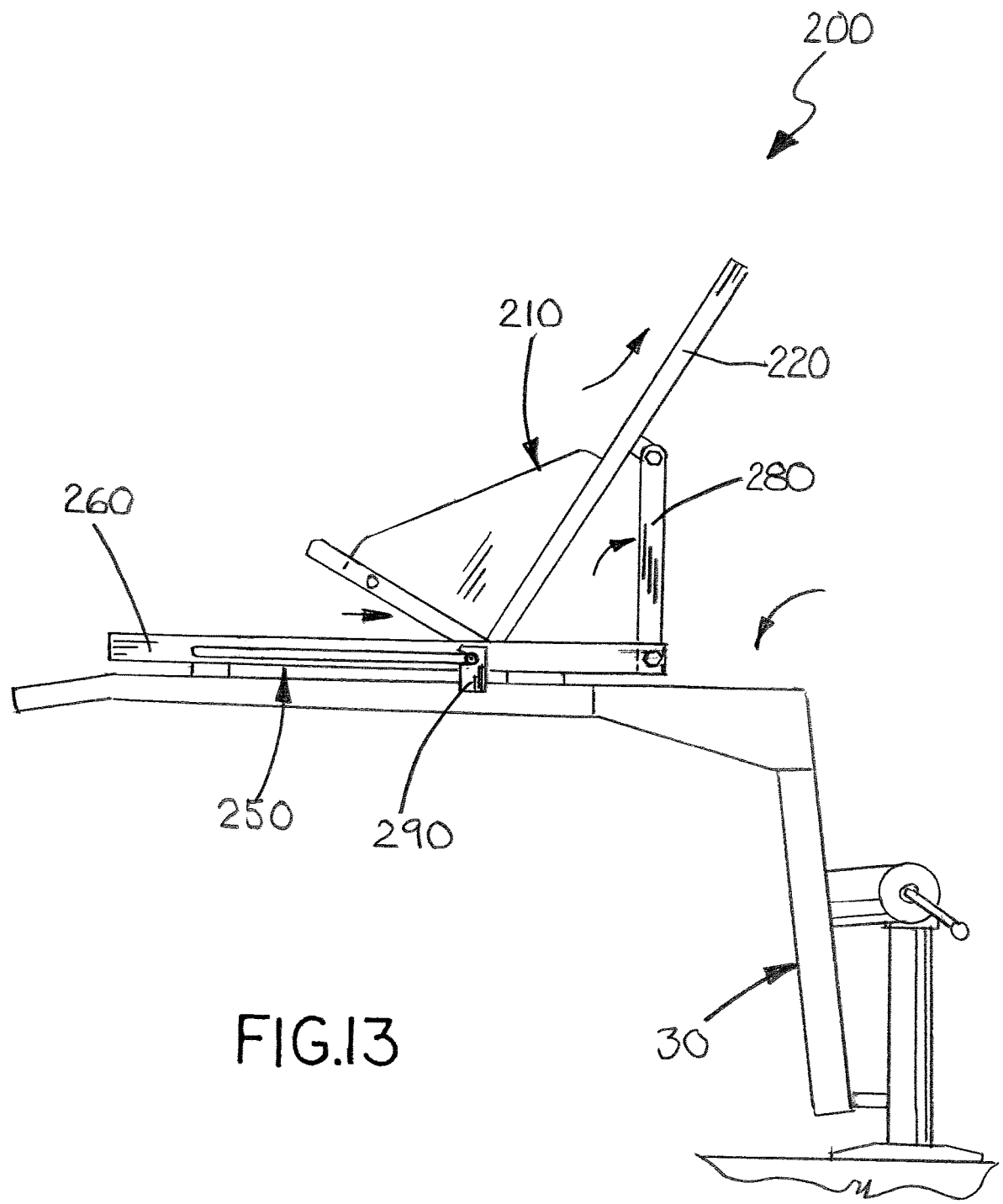
FIG. 13 is a side view of the vehicle and child carrier of FIG. 11 shown in the deployed position and with the seat back in a horizontal orientation.
Figure 14:
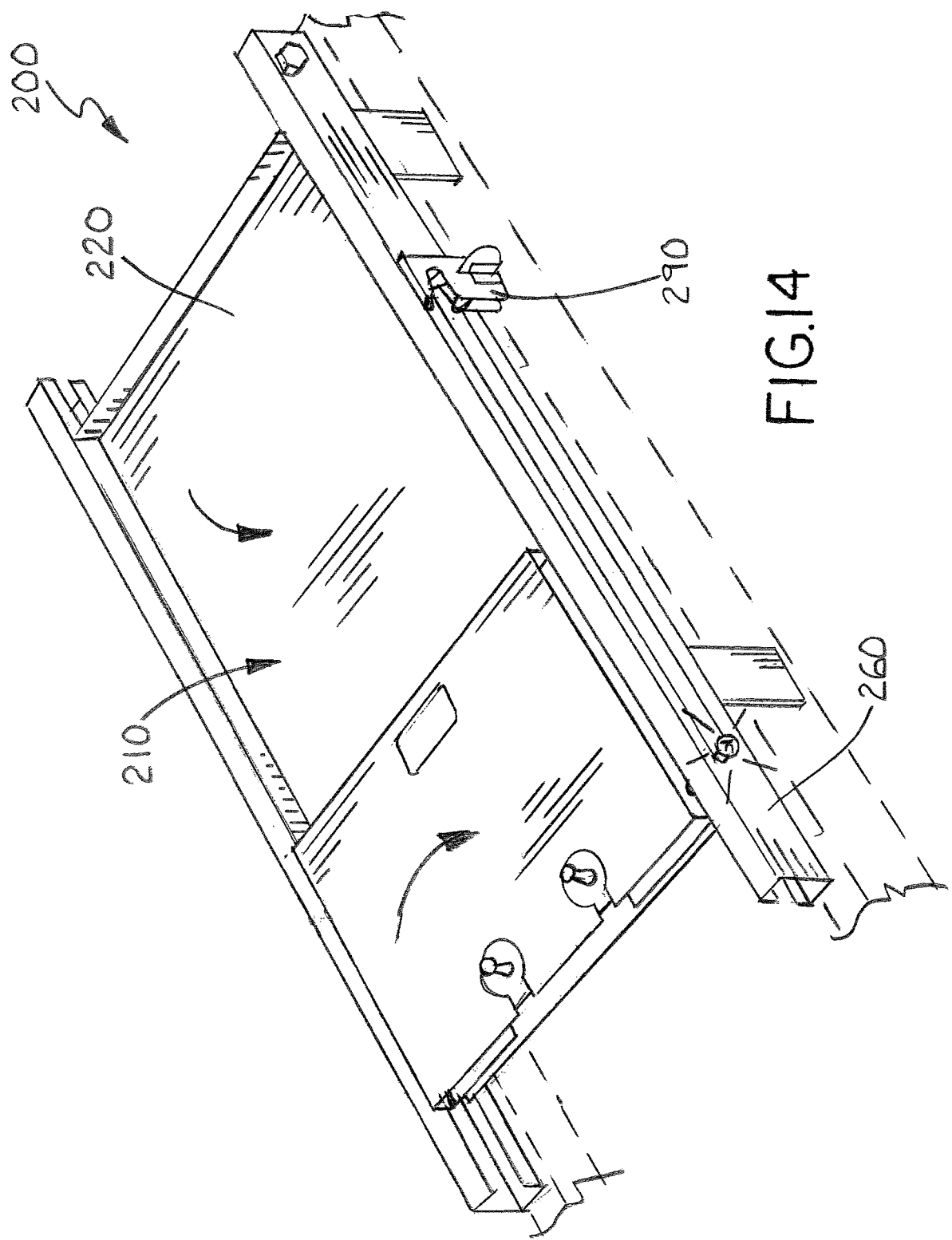
FIG. 14 is a partial perspective view of the child carrier of FIG. 11 shown in the stowed position.
Figure 15:
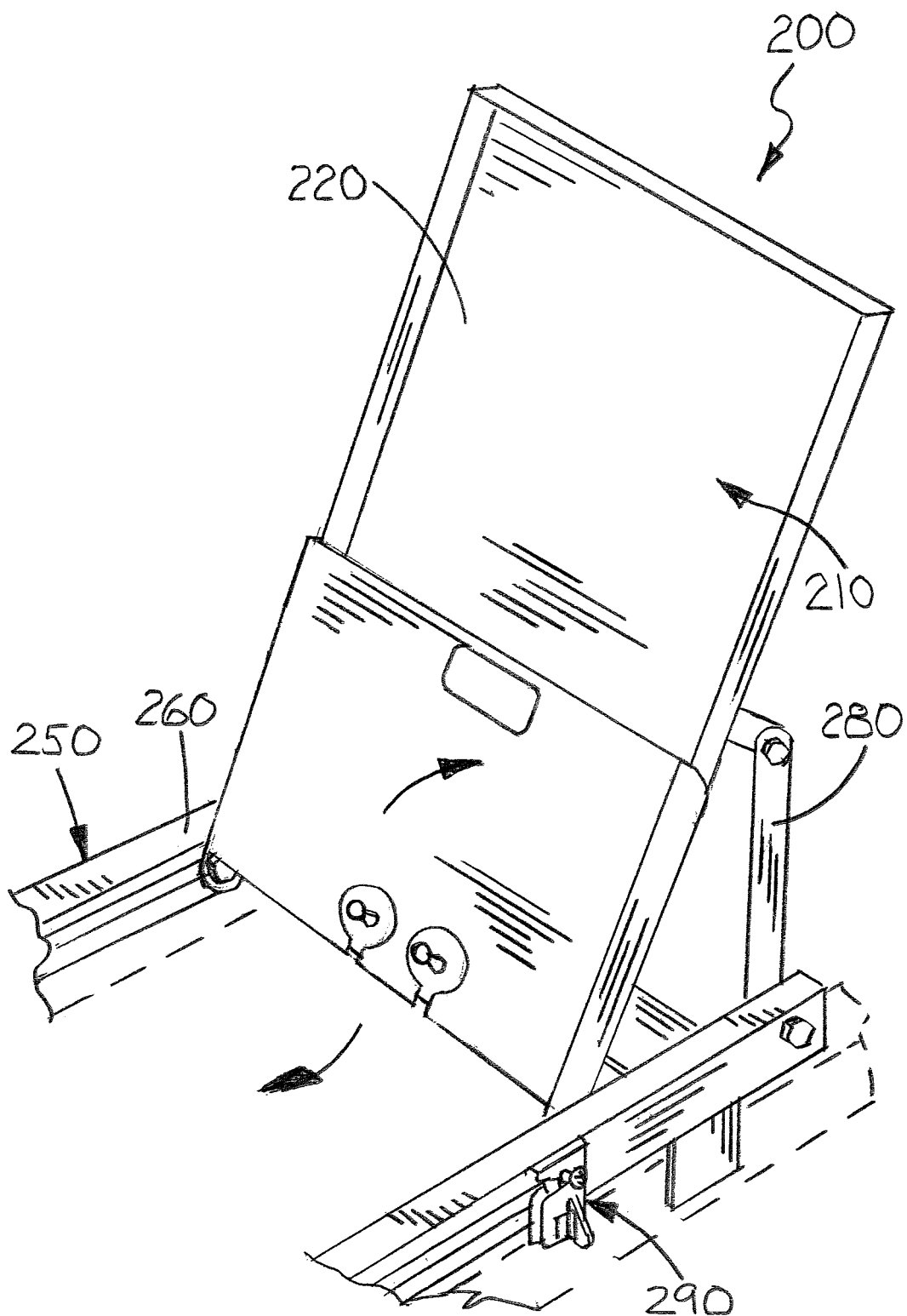
FIG. 15 is a partial perspective view of the child carrier of FIG. 11 shown partially deployed with the seat/cradle folded.
Figure 16:
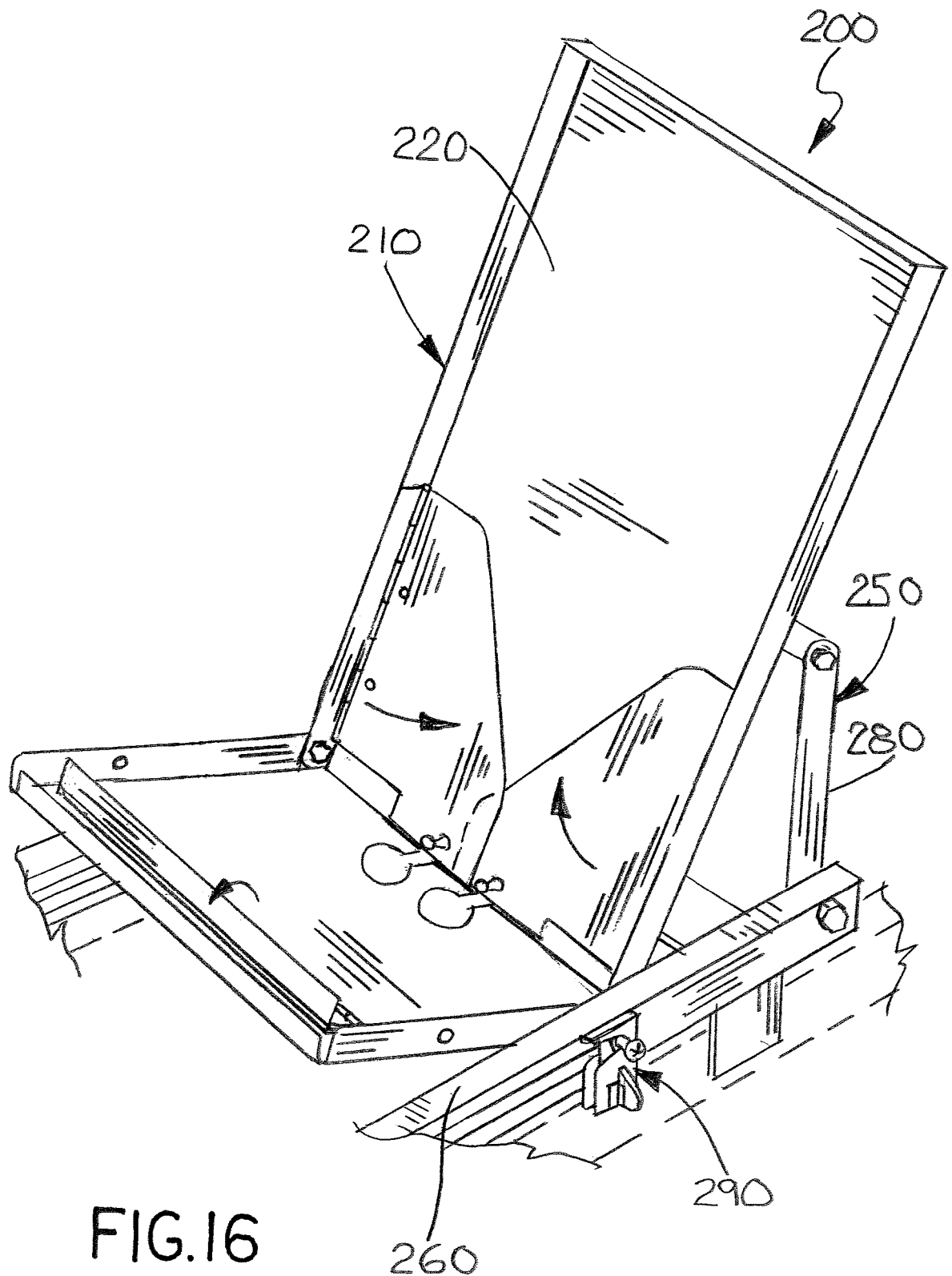
FIG. 16 is a partial perspective view of the child carrier of FIG. 11 shown partially deployed with the seat/cradle partially unfolded.
Figure 17:
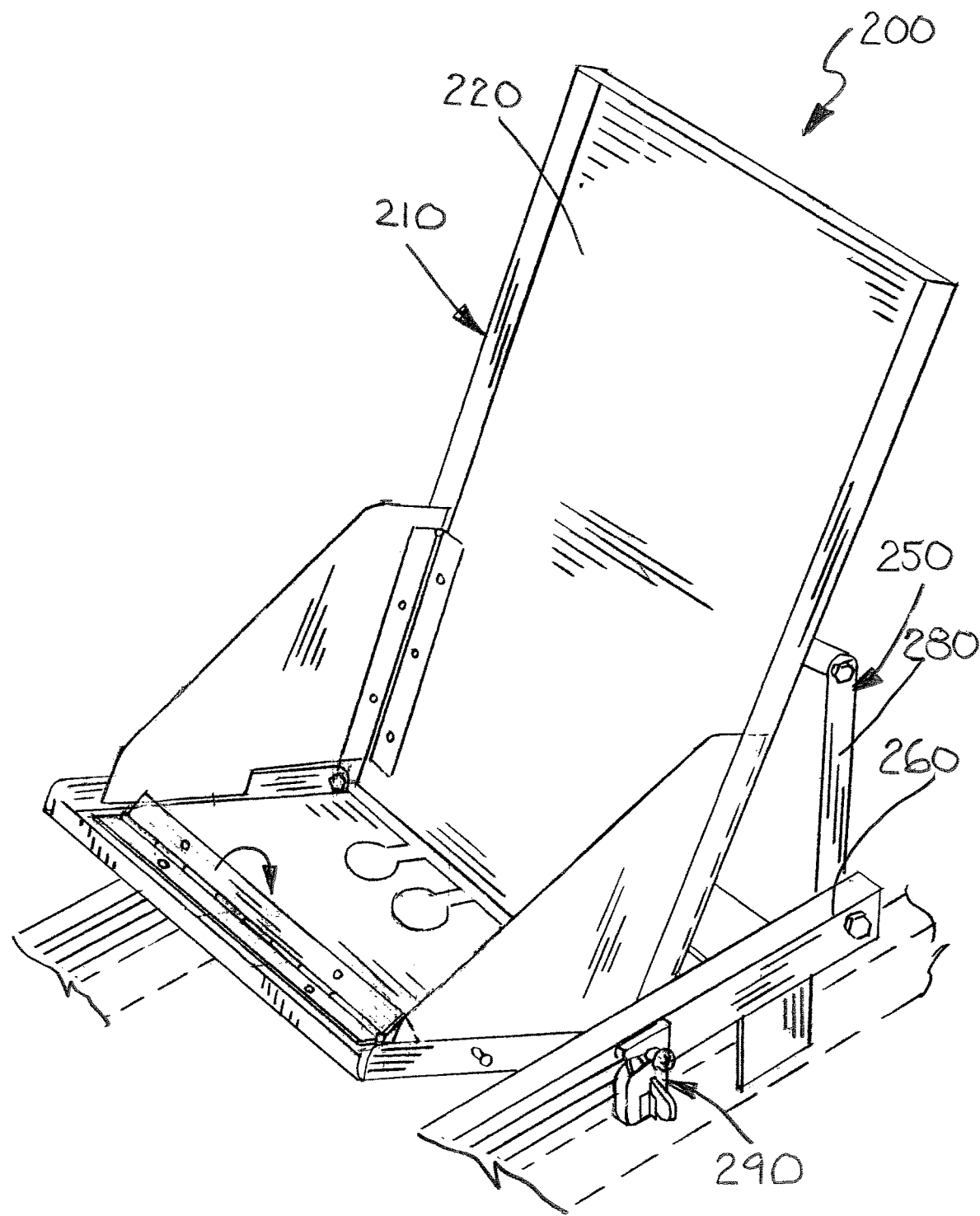
FIG. 17 is another partial perspective view of the child carrier of FIG. 11 shown partially deployed with the seat/cradle partially unfolded.
Figure 18:
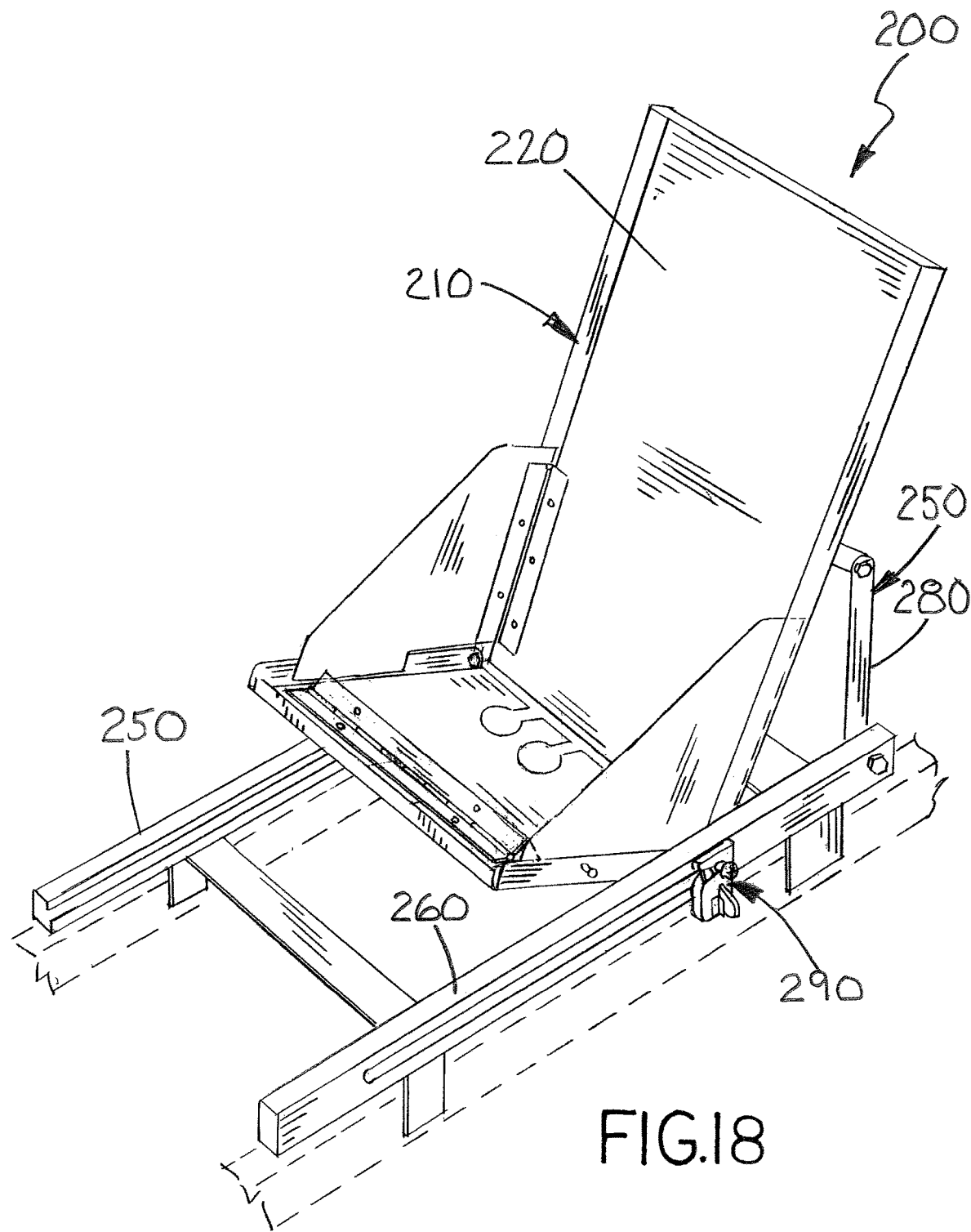
FIG. 18 is a partial perspective view of the child carrier of FIG. 11 shown partially deployed with the seat/cradle fully unfolded.
Figure 19:
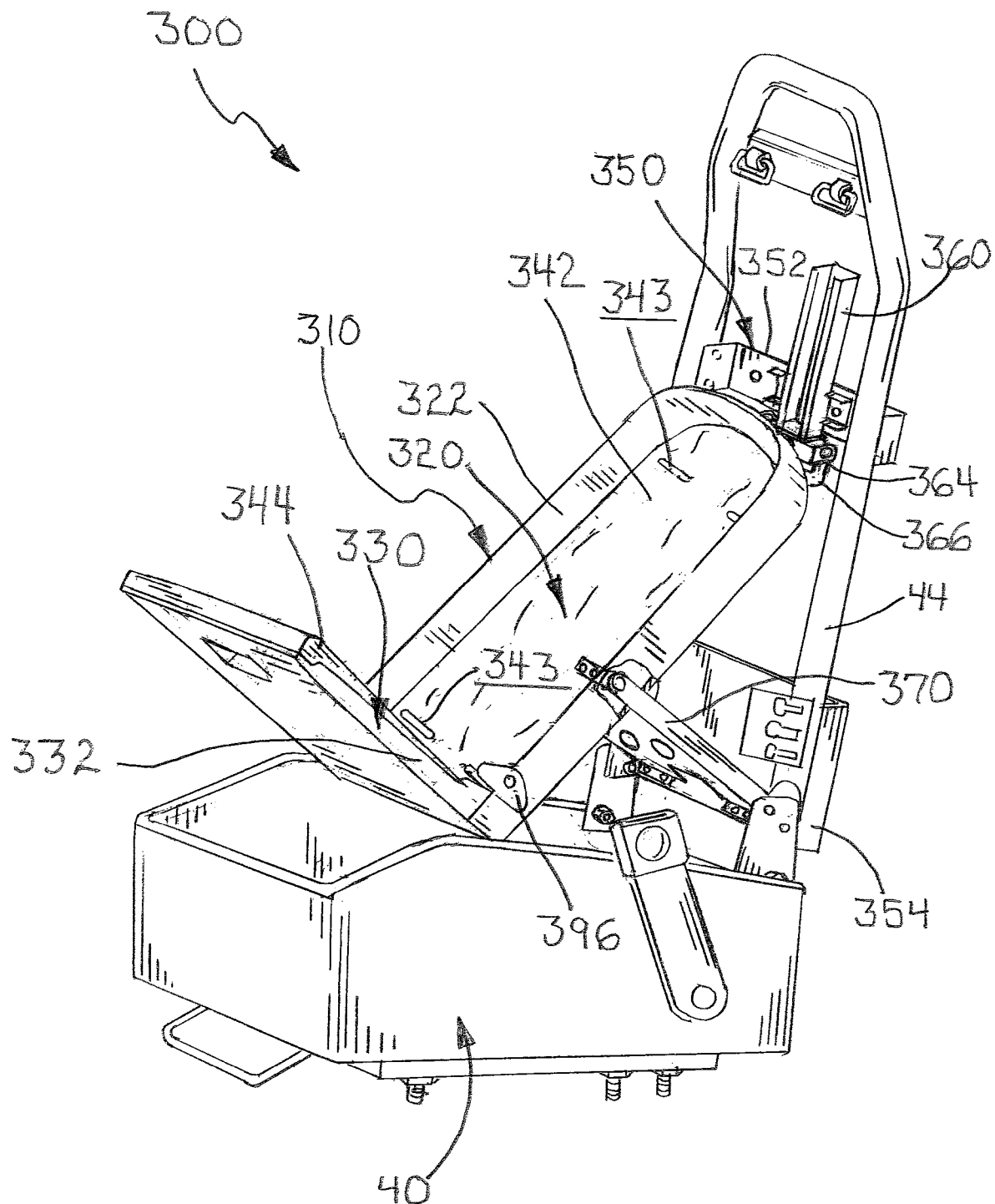
FIG. 19 is a partial perspective view of another exemplary embodiment of a vehicle seat of this invention without the main seat's upper covering and padding and having an internal child carrier shown deployed to carry an infant.
Figure 20:
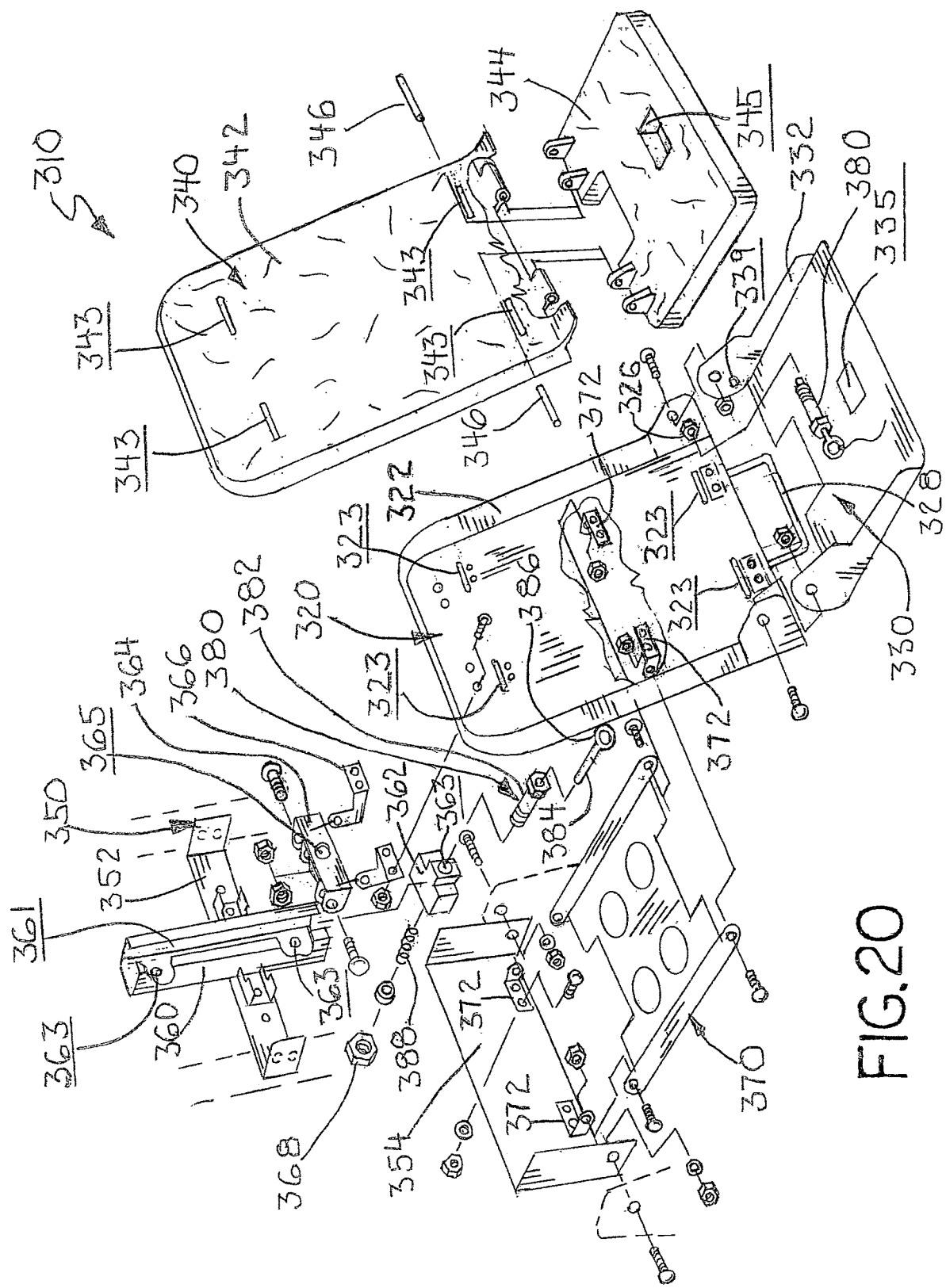
FIG. 20 is an exploded view of the child carrier of FIG. 19.

Seat/cradle 110 manually expands and collapses from a folded position (FIGS. 1 and 4) and an unfolded position (FIGS. 2, 7 and 8). In the folded position, side panels 130 and seat panel 140 are folded to lay flat over back panel 120. When folded flat, keyhole posts 134 of side panels 130 extend through keyhole openings 145 in folded seat panel 140 securing seat/cradle 110 in the folded position. In the unfolded position, seat panel 140 and side panels 130 are pivoted away from back panel 120 and held open by cover flange 146 that is rotated over to block side panels 130 from collapsing. Keyhole posts 134 of side panels 130 extend through holes 147 in the side flange of seat panel 140.

Carrier sub-frame 150 includes a pair of slide tracks 160, a set of slide blocks 170, a linkage member 180 and a latch assembly 190. Carrier sub-frame 150 is adapted to be mounted to the back of seat 20 securing to the chair's internal framework. Seat/cradle 110 is shiftably mounted to carrier sub-frame 150 and linkage 180 for movement between a stowed position where the cradle lies flat against the frame and a deployed position where the cradle extends outward from the frame. Slide rails 160 are typically lengths of square metal tubing or C-channel cut or bent to have inward facing longitudinal slots 161. Slide rails 160 are braced by two cross members 162. Slide rails 160 act as tracks for slide blocks 170. Slide blocks 170 are carried within each side rail 160 for traverse movement along the length of the rails. Slide blocks 170 are typically fashioned or formed from a block of low friction material, such as Teflon® and configured to conform to the geometric configuration of slide rails 160. Slide blocks 170 slide within side rails 160 to allow cradle 110 to be manually shifted between the stowed position (FIG. 1) and the deployed position (FIG. 2).

Linkage 180 is a flat member that is shiftably connected between cradle 110 and slide rails 160. Linkage 180 has four corner ears 182. One end of linkage 180 is pivotally connected to cradle 110 and track rails 170 by fastening hardware 184 that extends through aligned holes in ears 182, the mounting bracket and track rails. The top of cradle 110 is pivotally connected to slide blocks 170 by fastening bolts 172 extending through holes 171 of the blocks.

Latch mechanism 190 is affixed to one of slide rails 160 and secures cradle 110 in the stowed position. Latch mechanism 190 may use any suitable locking mechanics. As shown, latch mechanism 190 includes a latch body 192 and a latch bolt 194 extending from one of the slide blocks 170 through a slot in slide rail 160. Latch body 192 captures latch bolt 194 to hold slide block 170 in place.

FIGS. 4-10 illustrate the operation of infant seat 100 with the safety chair 20. To deploy child carrier 100, latch mechanism 190 is manually deactivated, which releases seat/cradle 110 to slide from the vertical stowed position into the deployed position under the force of gravity. Once in the deployed position, seat/cradle 110 is manually unfolded and locked in place by pivoting cover latch 146. To return child carrier 100 to the stowed position, seat/cradle 110 is folded up and manually lifted to slide the seat/cradle upward into engagement with latch mechanism 190.

FIGS. 11-18 illustrate another exemplary embodiment of a vehicle safety seat 30 using the child carrier of this invention, which is designated generally as reference numeral 200. Child carrier 200 is illustrated with a safety chair 30 having a pivoting back that moves between an upright position and a horizontal position. Child carrier 200 is designed to deploy from the chair's horizontal position. Consequently, child carrier 200 differs only slightly in design, construction and operation from infant seat 100, above. The difference lies principally in the connections between the folding seat/cradle 210 and carrier sub-frame 250. In child carrier 200, the orientation of folding seat/cradle 210 is reversed to be "upside down" with respect to the seat back, whereas the seat/cradle of child carrier 100 is oriented "upright" with respect to the upright seat back. As shown, the bottom of back panel 220 is pivotally connected to the slide blocks (not shown) and linkage 280 is connected to a mid point along back panel 220 and the end of slide tracks 260. From the stowed position, the bottom of folding seat/cradle 210 is manually slid toward the bottom of vehicle seat 30 and linkage 280 pivots back panel 220 upward. Seat/cradle 210 can be unfolded once it is secured in the deployed position by latch mechanism 290.

Figure 21:
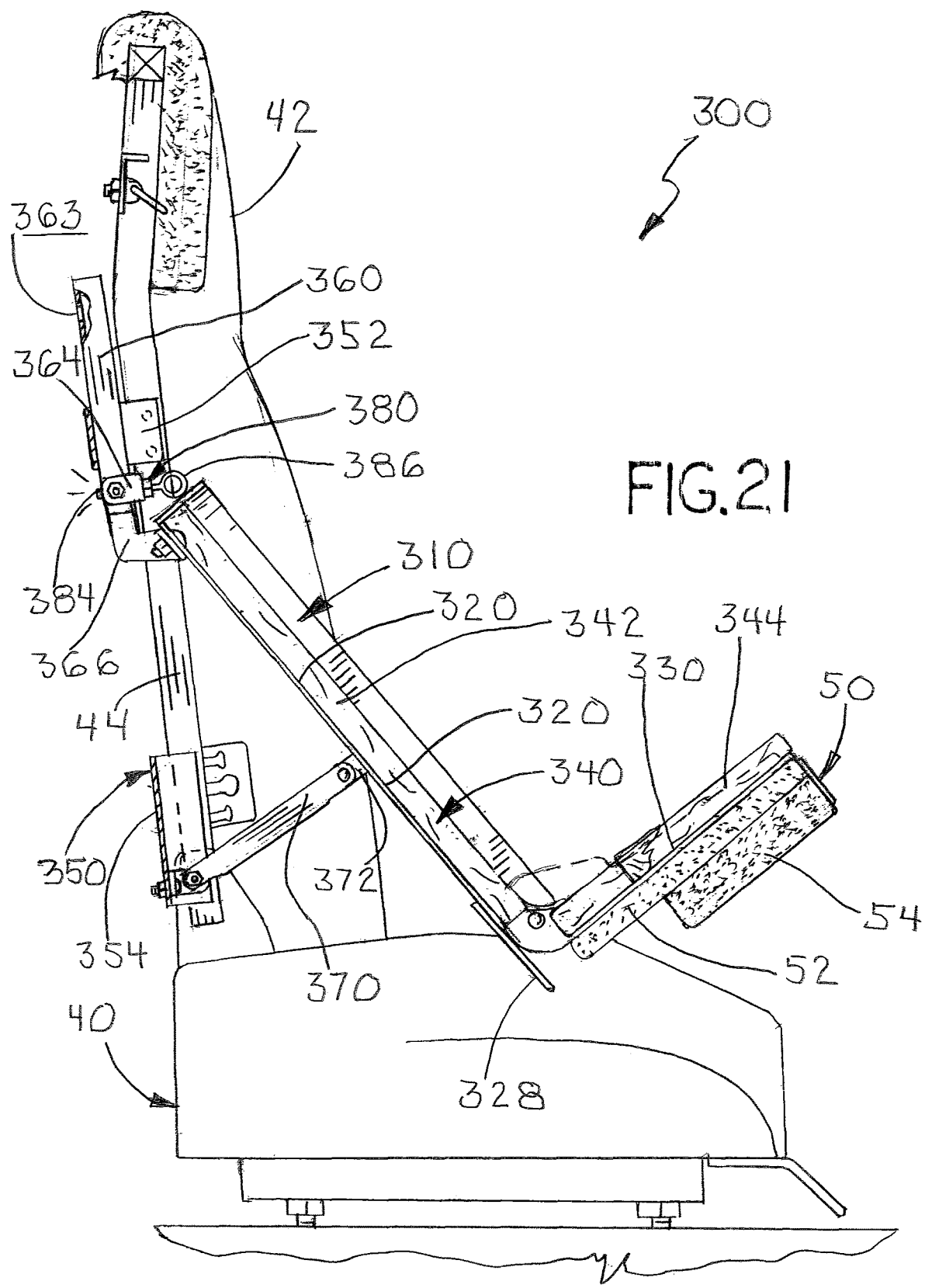
FIG. 21 is a partial side sectional view of the vehicle seat of FIG. 19 showing the integrated child carrier deployed and unfolded in a reclined position to carry an infant.
Figure 22:
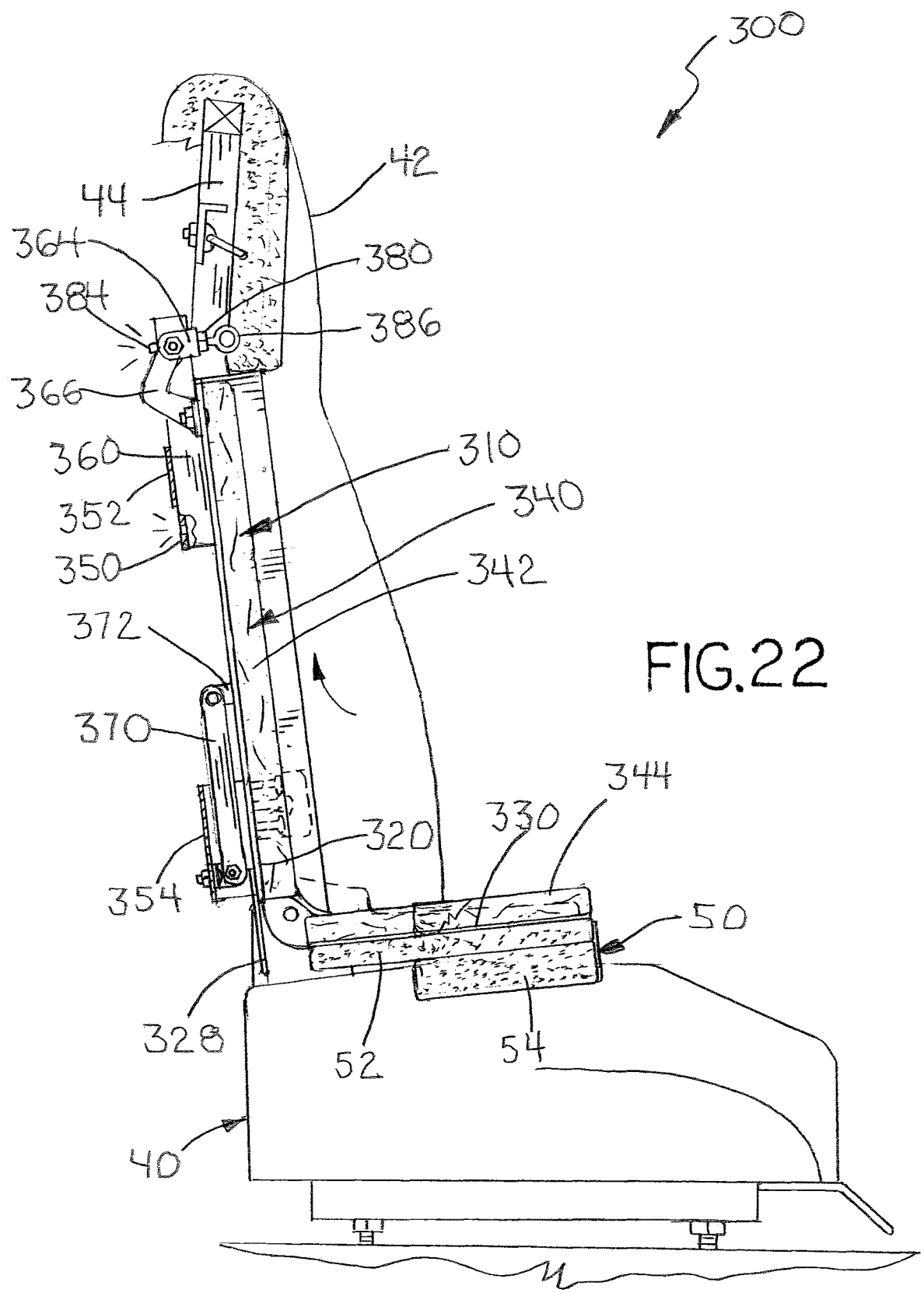
FIG. 22 is a partial side sectional view of the vehicle seat of FIG. 19 showing the integrated child carrier deployed and unfolded in an upright position to carry a toddler.
Figure 23:
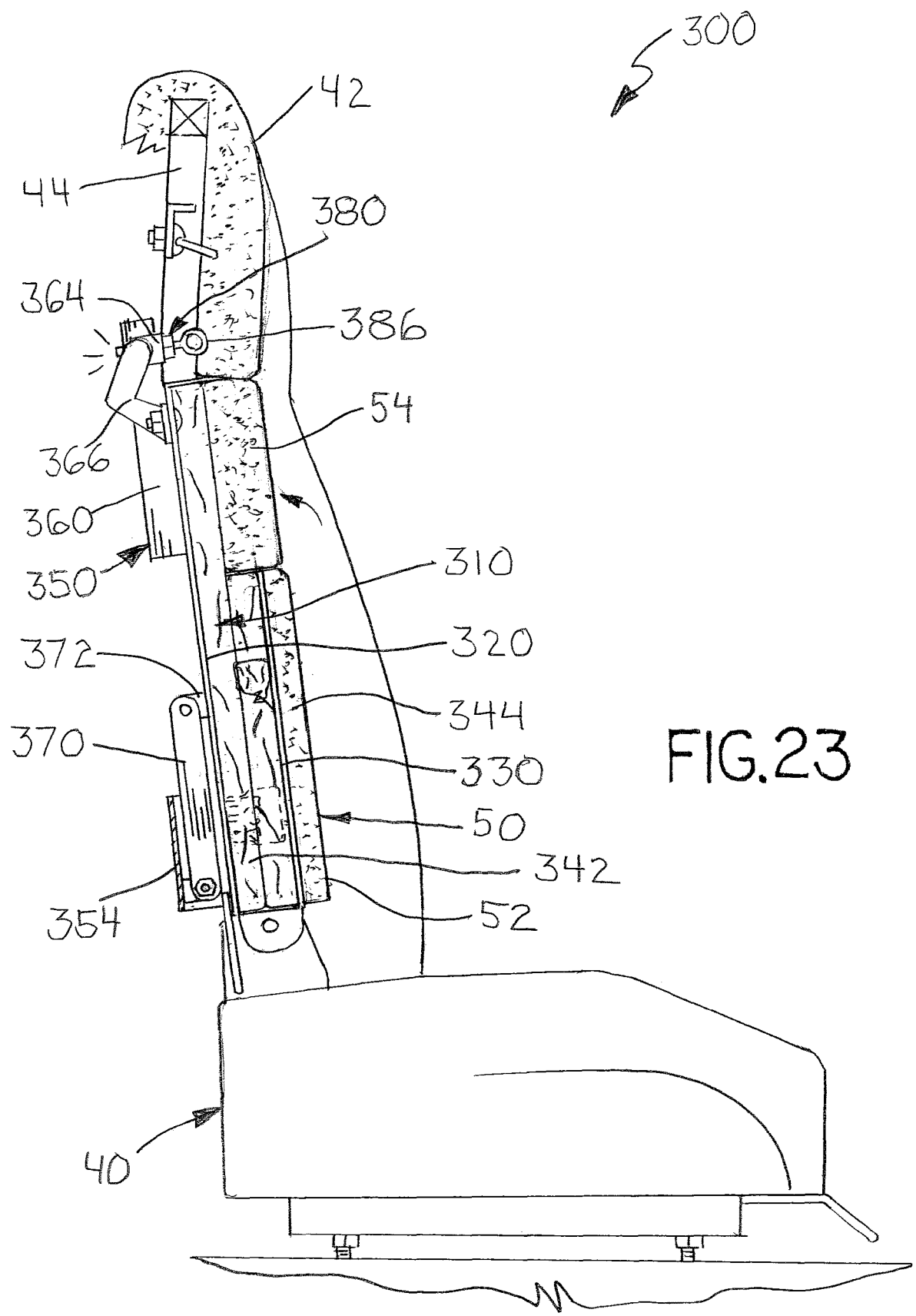
FIG. 23 is a partial side sectional view of the vehicle seat of FIG. 19 showing the integrated child carrier stowed within the main seat back.
Figure 24:
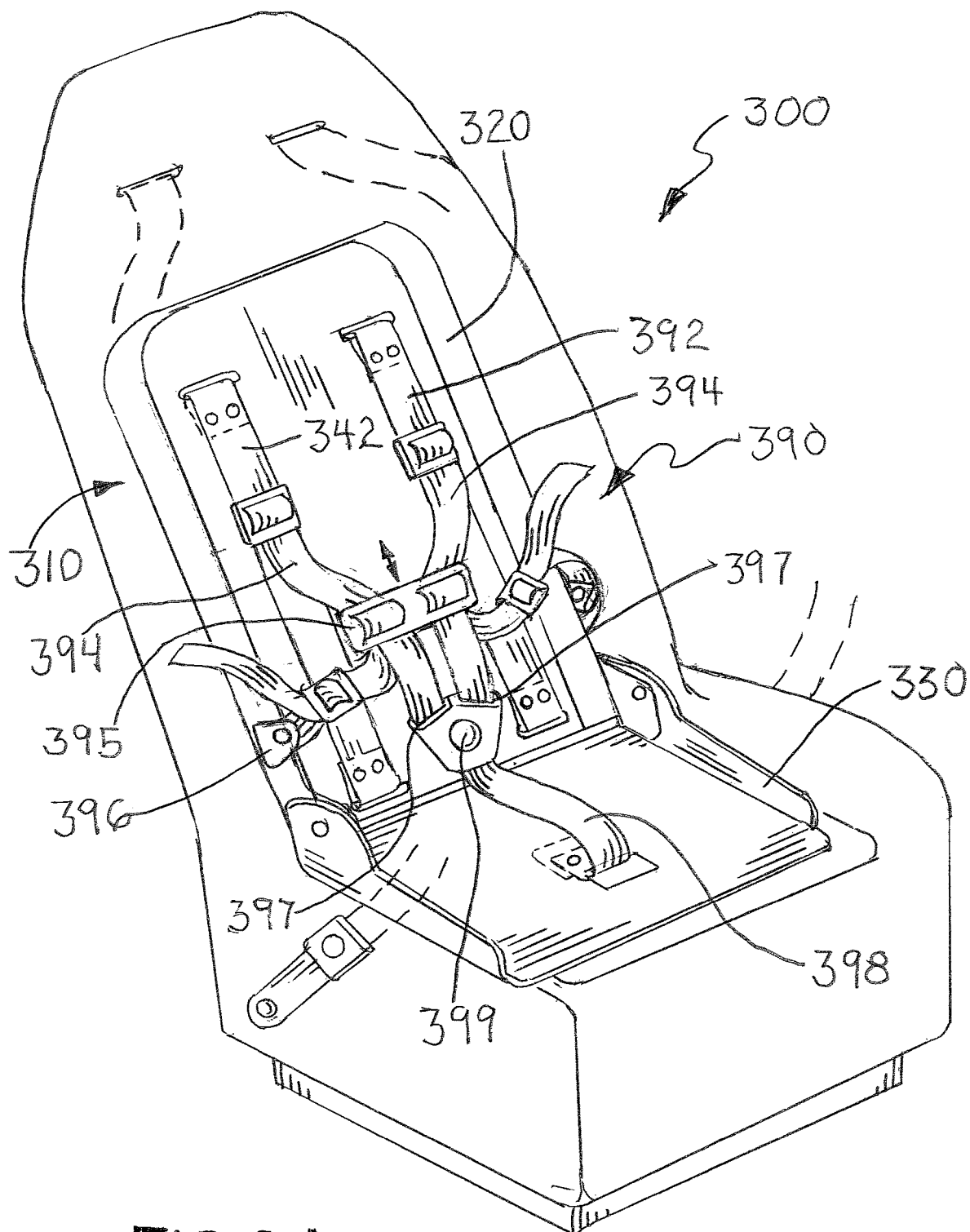
FIG. 24 is perspective view of the vehicle seat of FIG. 1 showing the child safety belt system of the child carrier.

FIGS. 19-24 illustrate another exemplary embodiment of a vehicle safety seat 40 using an internal child carrier of this invention, which is designated generally as reference numeral 300. Again, vehicle seat 40 is of the type used in emergency response vehicles well known in the art. Child carrier 300 is designed and intended to support and carry an infant or toddler generally under the weight of 65 lbs on the back of seat 20. Child carrier 300 manually deploys forward from a stowed position within the seat back. Child carrier 300 includes a folding seat/cradle 310 and a carrier sub-frame 350 mounted to the seat back's internal frame 44. Seat/cradle 310 is shiftably mounted to the sub-frame 150 which allows the seat/cradle to deploy from an interior compartment within seat back 42 to a reclined infant position (FIG. 21) or an upright toddler position (FIG. 22). Seat/cradle 310 also expands between folded and unfolded positions (FIGS. 21 and 22 respectively). Seat 40 typically includes a seat back pad (not shown) that covers child carrier 300 when in the stowed position (FIG. 23). Seat back pad 50 is fitted to seat/cradle 310 to fold conveniently away when the carrier is deployed, but form part of the adult seat back 42 when stowed.

Seat/Cradle 310 includes a back panel 320 a seat panel 330, and a contoured cradle insert 340. Back panel 320 and seat panel 330 are typically cut, pressed and/or formed out of a suitable sheet metal. Back panel 320 and seat panel 330 are pivotally connect by a pair of bolt fasteners that extend through aligned holes in the side walls of each panel. A U-shaped support brace 328 is mounted to back panel 320 to extend below the bottom edge of the back panel. Support brace 328 supports seat/cradle 310 over the main seat base of seat 40 when the seat/cradle is deployed to the reclined infant position and unfolded. In certain embodiments, support brace 328 may also act as a tether anchor to hold seat/cradle 310 down against the seat base.

Cradle insert 340 is a two-piece molded plastic backing contoured to cover back panel 320 and seat panel 330. Cradle insert 340 nests inside the peripheral side walls of the back and seat panels, 322 and 332, respectively. Cradle insert 340 includes a back section 342 that nests inside peripheral sidewalls 322 of back panel 320 and a seat section 344 that nests inside the sidewalls 332 of seat panel 330. Back section 342 and seat section 344 are pivotally connected by a pair of hinge pins 346 extending between align holes in complimentary hinge parts formed in the back and seat sections.

Carrier sub-frame 350 includes a pair of cross braces 352 and 354 welded to the internal back frame 44 of seat back 42. Cross brace 352 supports an internal vertical rail 360 in the center of seat back 42. Rail 360 is a length of C-channel having an open forward facing longitudinal slot 361. Carrier sub-frame 350 also includes a linkage plate 370 which is pivotally connected to a pair of mounting brackets 372 affixed to cross brace 354 and the back side of back panel 320 by conventional bolt and hex nut fasteners. An internal slide block 362 is shiftably disposed within rail 360, which slides along the length of the rail. Back panel 320 is pivotally connected to slide block 362 by a pivoting slide bracket 364 and a pair of leg brackets 366 using a "pull-pin" bolt assembly 380. As shown, one end of leg brackets 366 is pivotally connected to slide bracket 364 by conventional bolt and hex nut fasteners or other suitable means. The opposite end of leg brackets 366 is affixed to the back side of back panel 320 by conventional bolt and hex nut fasteners or other suitable means. Pull pin bolt assembly 380 includes a hollow bolt 382 with a spring loaded extensible pin 384 with an integral end ring 386. An internal spring 388 urges pin 384 to extend outward from the distal end of bolt 382. Bolt 382 extends through aligned bores in slide bracket 364 and slide block 362 and is secured by a hex nut 368. The back of rail 360 has two or more holes 363 through which pin 374 seats to securely hold seat/cradle 310 in either an upright or stowed position (FIG. 23) or reclined deployed position (FIGS. 21 and 22). Manually pulling pin 384 partial through bolt 382 withdraws the pin from one of holes 363 to allow seat/cradle 310 to be manually moved between the upright and reclined position. Seat/Cradle 310 also includes a second "pull pin" bolt assembly 380' mounted to back panel 320, which is used to lock the seat panel in either the folded or unfolded positions. Pull pin bolt assembly 380' is turned into a nut 326 welded to the sidewall of back panel 320 so that the pin (not shown) extends into one of two holes 339 in seat panel sidewall 332.

Child carrier 300 also includes its own safety belting systems 390, which is separate and independent from the adult safety belt system (not fully shown) of seat 40. Belting systems 390 stows inside the collapsed seat/cradle 310 when not in use, but is readily available once seat/cradle 310 is deployed and unfolded. As shown, belt system 390 is a conventional 5 point harness belting system that can be used to safely secure both infants in the reclined cradle position and toddlers in the upright position. Belt system 390 includes a pair of fixed slide straps 392, a pair of shoulder straps 394 and a center seat strap 398. Slide straps 392 lie flat against the front side of seat insert back 342. The ends of slide straps 392 extend through slots formed in the back panel 320 and insert back 342 to securely mount to the back side of back panel 320. Slide straps 392 act as rails upon which shoulder straps 394 ride to accommodate varying torso length between children and infants. Each shoulder strap 394 terminates in a slide connector 393, which shiftably rides on slide straps 392. Each shoulder strap 394 also has an adjustable sternum connecter 395 and center buckle connector 397. Seat strap 398 terminates with an adjustable center buckle 399. Sternum connectors 395 interconnect over the child chest and buckle connectors 397 interconnect with center buckle 398.

Figure 25:
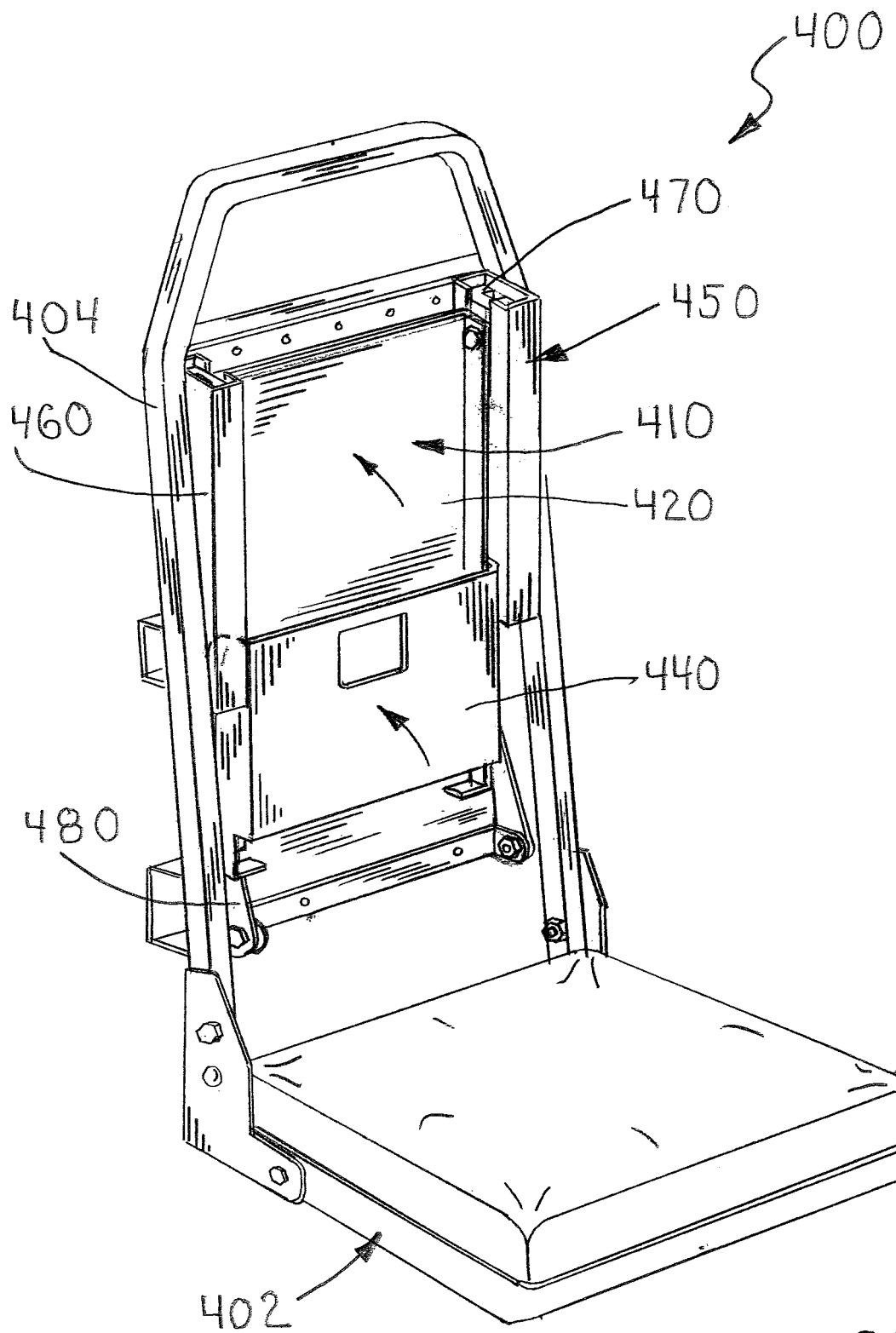
FIG. 25 is a partial perspective view of another exemplary embodiment of a vehicle seat of this invention having another embodiment internal child carrier shown in a stowed position.

FIGS. 25 and 26 illustrate another exemplary embodiment of a vehicle safety seat 402 using an internal child carrier of this invention, which is designated generally as reference numeral 400. As with child carrier 300, child carrier 400 is designed to manually deploy forward from a stowed position within the seat back. Child carrier 400 includes a folding seat/cradle 410 and a carrier sub-frame 450 mounted to the seat back's internal frame 404. Seat cradle 410 is slideably mounted to the sub-frame 450 which allows the seat/cradle to slide between a stowed position and two deployed positions—a reclined infant position and an upright toddler position. Seat/cradle 410 also expands between folded and unfolded positions. As shown, child carrier 400 is identical to that of child carrier 300 in function and structure, and differs only in the use of two rails 460 in the sub-frame to guide the movement of seat/cradle 410 between its upright and reclined positions. Although not shown, child carrier 400 is adapted to include its own separate safety belt system for used in securing a toddler or infant carried within the seat/cradle 410.

It should be apparent from the foregoing that an invention having significant advantages has been provided. While the invention is shown in only a few of its forms, it is not limited to, but is susceptible to various changes and modifications without departing from the spirit thereof. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

We claim:

1. A vehicle seat comprising:
   a seat base;
   a seat back extending over the seat base and having an internal seat back frame; and
   a child carrier adapted to carry a child and mounted to the seat back frame for movement between a stowed position disposed within the seat back and a deployed position extending outward from the seat back,
   the child carrier includes a seat/cradle and a sub-frame mounted to the seat back frame,
   the seat/cradle includes a back panel and a seat panel hinged to the back panel for movement between the folded position where the seat panel lies flat over the back panel and an unfolded position where the seat panel extends from the back panel to receive the child,
   the sub-frame includes an elongated rail stationarily mounted to the seat back frame, a slide block carried by the rail for traverse movement along the length of the rail, a coupling part pivotally connecting the back panel to the slide block; and a linkage member pivotally connected to the seat back frame at one end thereof and the back panel at the opposite end thereof,
   the seat/cradle is shiftably mounted to the sub-frame for movement between a first position where the back panel lies substantially parallel to the seat back frame and a second position where the back panel extends outward at an angle from the seat back frame over the seat base.

2. The vehicle seat of claim 1 wherein the seat/cradle is in the first position and the seat panel is in the folded position when the child carrier is in the stowed position.

3. The vehicle seat of claim 1 wherein the seat/cradle is in the first position and the seat panel is in the unfolded position when the child carrier is in the deployed position to carry the child in an upright position, the seat/cradle is in the second position and the seat panel is in the unfolded position when the child carrier is in the deployed position to carry the child in a reclined position.

4. The vehicle seat of claim 1 wherein the seat/cradle includes a latch mechanism for locking the back panel in the folded position and the unfolded position.

5. The vehicle seat of claim 1 wherein the seat/cradle includes a latch mechanism for locking the seat/cradle in the first position and the second position.

6. The vehicle seat of claim 1 wherein the seat/cradle has an insert covering the back panel and the seat panel.

7. The vehicle seat of claim 1 and a first safety belt system adapted for securing an adult within the vehicle seat and operatively mounted to the seat base and seat back, the child carrier also includes a second safety belt system adapted for securing a child within the child carrier and operatively mounted to the seat/cradle.

8. The vehicle seat of claim 7 wherein the second safety belt system is operatively independent and separate of the first safety belt system.

9. The vehicle seat of claim 1 wherein the child carrier is spaced over the seat base when the child carrier is in the deployed position.

10. The vehicle seat of claim 9 wherein the seat back has an interior seat back cavity, the child carrier mounted within the seat back cavity for movement to the deployed position forward of the seat back.

11. The vehicle seat of claim 1 wherein the sub-frame extends from the backside of the seat back.

12. A child carrier adapted to carry a child and mountable to a structure, the child carrier comprising:
   a sub-frame mountable to the structure; and
   a seat/cradle,
   the seat/cradle includes a back panel and a seat panel hinged to the back panel for movement between a folded position where the seat panel lies flat over the back panel and an unfolded position where the seat panel extends from the back panel to receive the child,
   the sub-frame includes an elongated rail stationarily mounted to the structure, a slide block carried by the rail for traverse movement along the length of the rail, a coupling part pivotally connecting the back panel to the slide block; and a linkage member pivotally connected to the structure at one end thereof and the back panel at the opposite end thereof,
   the seat/cradle is shiftably mounted to the sub-frame for movement between a first position where the back panel lies substantially parallel to the structure and a second position where the back panel extends outward at an angle from the structure.

13. The child carrier of claim 12 wherein the seat/cradle is in the first position and the seat panel is in the folded position when the child carrier is in the stowed position.

14. The child carrier of claim 12 wherein the seat/cradle in the first position and the seat panel is in the unfolded position when the child carrier is in the deployed position to carry the child in an upright position, the seat/cradle is in the second position and the seat panel is in the unfolded position when the child carrier is in the deployed position to carry the child in a reclined position.

15. The child carrier of claim 12 wherein the seat/cradle includes a latch mechanism for locking the back panel in the folded position and the unfolded position.

16. The child carrier of claim 12 wherein the seat/cradle includes a latch mechanism for locking the seat/cradle in the first position and the second position.

17. The child carrier of claim 12 wherein the seat/cradle has an insert covering the back panel and the seat panel.

18. The child carrier of claim 12 wherein the child carrier also includes a safety belt system adapted for securing a child within the child carrier and operatively mounted to the seat/cradle.

\* \* \* \* \*